US 6,651,893 B2

(12) United States Patent
He et al.

(10) Patent No.: US 6,651,893 B2
(45) Date of Patent: *Nov. 25, 2003

(54) ERROR CORRECTION IN MACRO BAR CODE SYMBOLS

(75) Inventors: Duanfeng He, Farmingville, NY (US); Kevin Hunter, East Setauker, NY (US); Steven J. Shellhammer, Lake Grove, NY (US); Sundeep Kumar, Port Jefferson, NY (US)

(73) Assignee: Symbol Technologies, Inc., Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,185

(22) Filed: Dec. 21, 1999

(65) Prior Publication Data

US 2002/0088865 A1 Jul. 11, 2002

Related U.S. Application Data

(63) Continuation of application No. 09/014,482, filed on Jan. 28, 1998, now Pat. No. 6,126,074.

(51) Int. Cl.$^7$ .............................................. G06K 19/06
(52) U.S. Cl. .................................... 235/494; 235/462.1
(58) Field of Search ...................... 235/494, 462.08, 235/462.09, 462.1, 462.11; 380/51, 54

(56) References Cited

U.S. PATENT DOCUMENTS

| 3,847,346 | A | | 11/1974 | Dolch | 235/61.11 E |
|---|---|---|---|---|---|
| 4,409,470 | A | | 10/1983 | Shepard et al. | 235/462.35 |
| 4,816,661 | A | | 3/1989 | Krichever et al. | 235/472 |
| 4,866,636 | A | * | 9/1989 | Fukami et al. | 364/514 |
| 5,126,544 | A | | 6/1992 | Izumi | 235/462 |
| 5,138,140 | A | | 8/1992 | Siemiatkowski et al. | 235/462 |
| 5,151,581 | A | | 9/1992 | Krichever et al. | 235/467 |
| 5,235,167 | A | | 8/1993 | Dvorkis et al. | 235/462 |
| 5,243,655 | A | | 9/1993 | Wang | 380/51 |
| 5,278,398 | A | | 1/1994 | Pavlidis et al. | 235/462 |
| 5,304,786 | A | | 4/1994 | Pavlidis et al. | 235/462 |
| 5,319,181 | A | | 6/1994 | Shellhammer et al. | 235/462 |
| 5,369,265 | A | | 11/1994 | Adachi et al. | 235/462 |
| 5,378,881 | A | | 1/1995 | Adachi | 235/462 |
| 5,412,194 | A | | 5/1995 | Melbye et al. | 235/437 |
| 5,414,250 | A | | 5/1995 | Swartz et al. | 235/462 |
| 5,471,533 | A | * | 11/1995 | Wang et al. | 380/51 |
| 5,473,148 | A | * | 12/1995 | Tanaka et al. | 235/462 |
| 5,478,997 | A | | 12/1995 | Bridgelall et al. | 235/462 |
| 5,479,418 | A | * | 12/1995 | Hughes-Hartogs | 371/40.1 |
| 5,479,515 | A | * | 12/1995 | Longacre, Jr. | 380/54 |
| 5,504,316 | A | | 4/1996 | Bridgelall et al. | 235/462.07 |
| 5,523,552 | A | | 6/1996 | Shellhammer et al. | 235/462 |
| 5,553,084 | A | * | 9/1996 | Ackley et al. | 371/37.1 |
| 5,591,956 | A | | 1/1997 | Longacre, Jr. et al. | 235/494 |
| 5,627,935 | A | * | 5/1997 | Kim | 386/81 |
| 5,635,697 | A | | 6/1997 | Shellhammer et al. | 235/462 |
| 5,636,316 | A | * | 6/1997 | Oku et al. | 386/112 |
| 5,761,219 | A | | 6/1998 | Maltsev | 371/37.1 |
| 5,790,715 | A | | 8/1998 | Iizuka | 382/309 |

FOREIGN PATENT DOCUMENTS

JP 411312215 * 11/1999 ............ G06K/7/10

* cited by examiner

*Primary Examiner*—Karl D. Frech
(74) *Attorney, Agent, or Firm*—Fish & Richardson P.C.

(57) ABSTRACT

A data encoding/decoding scheme includes a plurality of bar code symbols each carrying a portion of the data in which improved error correction capabilities are incorporated. According to one aspect, once data codewords have been derived to form the symbols, a first set of data correction elements are derived from a first field, then a second set of error correction elements are derived from the data elements and the first set of error correction elements using a second, wider field.

12 Claims, 14 Drawing Sheets

| PDF417 SECURITY LEVEL ||
| SECURITY LEVEL | ERROR CORRECTION CODEWORDS |
| --- | --- |
| 0 | 0 |
| 1 | 2 |
| 2 | 6 |
| 3 | 14 |
| 4 | 30 |
| 5 | 62 |
| 6 | 126 |
| 7 | 254 |
| 8 | 510 |

$$\begin{array}{ccccc}
i_{1,1} & i_{1,2} & i_{1,3} & \cdots & i_{1,j} \\
i_{2,1} & i_{2,2} & i_{2,3} & & i_{2,j} \\
\vdots & & & & \vdots \\
i_{r,1} & i_{r,2} & i_{r,3} & \cdots & i_{r,j}
\end{array}$$

*FIG. 5A*

$$\begin{array}{ccccc}
i_{1,1} & i_{1,2} & i_{1,3} & \cdots & i_{1,j} \\
i_{2,1} & i_{2,2} & i_{2,3} & & i_{2,j} \\
\vdots & & & & \\
i_{r,1} & i_{r,2} & i_{r,3} & & i_{r,j} \\
\hline
c_{r+1,1} & c_{r+1,2} & c_{r+1,3} & & c_{r+1,j} \\
\vdots & & & & \\
c_{s,1} & c_{s,2} & c_{s,3} & \cdots & c_{s,j}
\end{array}$$

*FIG. 5B*

$$\begin{array}{cccc|ccc}
i_{1,1} & i_{1,2} & i_{1,3} & \cdots \; i_{1,j} & a_{1,j+1} & \cdots & a_{1,k} \\
i_{2,1} & i_{2,2} & i_{2,3} & i_{2,j} & a_{2,j+1} & \cdots & a_{2,k} \\
\vdots & & & & & & \\
i_{r,1} & i_{r,2} & i_{r,3} & i_{r,j} & a_{r,j+1} & \cdots & a_{r,k} \\
\hline
c_{r+1,1} & c_{r+1,2} & c_{r+1,3} & c_{r+1,j} & a_{r+1,j+1} & \cdots & a_{r+1,k} \\
\vdots & & & & & & \\
c_{s,1} & c_{s,2} & c_{s,3} & \cdots \; c_{s,j} & a_{s,j+1} & \cdots & a_{s,k}
\end{array}$$

*FIG. 5C*

| $i_{1,1}$ | $i_{1,2}$ | $i_{1,3}$ | ... | $i_{1,j}$ | $a_{1,j+1}$ | ... | $a_{1,k}$ | $d_{1,k+1}$ | ... | $d_{1,n}$ |

| $c_{s,1}$ | $c_{s,2}$ | $c_{s,3}$ | ... | $c_{s,j}$ | $a_{s,j+1}$ | ... | $a_{s,k}$ | $d_{s,k+1}$ | ... | $d_{s,n}$ |

FIG. 5D

| $i_{1,1}$ $i_{2,1}$ ...... $i_{r,1}$ | $i_{1,2}$ $i_{2,2}$ ...... $i_{r,2}$ | $i_{1,3}$ $i_{2,3}$ ...... $i_{r,3}$ | ... ... ... | $i_{1,j}$ $i_{2,j}$ ... $i_{r,j}$ | $a_{1,j+1}$ $a_{2,j+1}$ ... $a_{r,j+1}$ | ... ... ... | $a_{1,k}$ $a_{2,k}$ ... $a_{r,k}$ | $d_{1,k+1}$ $d_{2,k+1}$ ... $d_{r,k+1}$ | ... ... ... | $d_{1,n}$ $d_{2,n}$ ... $d_{r,n}$ |
|---|---|---|---|---|---|---|---|---|---|---|
| $c_{r+1,1}$ ... $c_{s,1}$ | $c_{r+1,2}$ ... $c_{s,2}$ | $c_{r+1,3}$ ... $c_{s,3}$ | ... ... | $c_{r+1,j}$ ... $c_{s,j}$ | $a_{r+1,j+1}$ ... $a_{s,j+1}$ | ... ... | $a_{r+1,k}$ ... $a_{s,k}$ | $d_{r+1,k+1}$ ... $d_{s,k+1}$ | ... ... | $d_{r+1,n}$ ... $d_{s,n}$ |

FIG. 5E

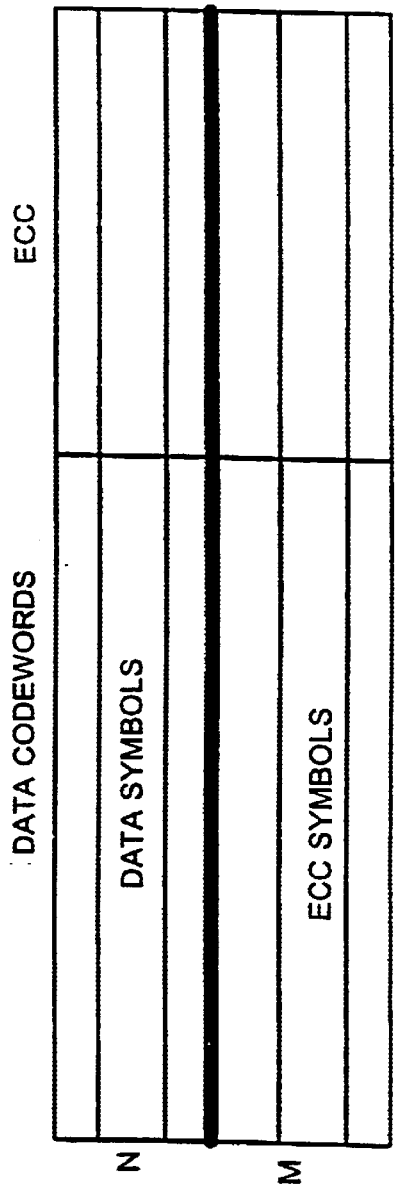

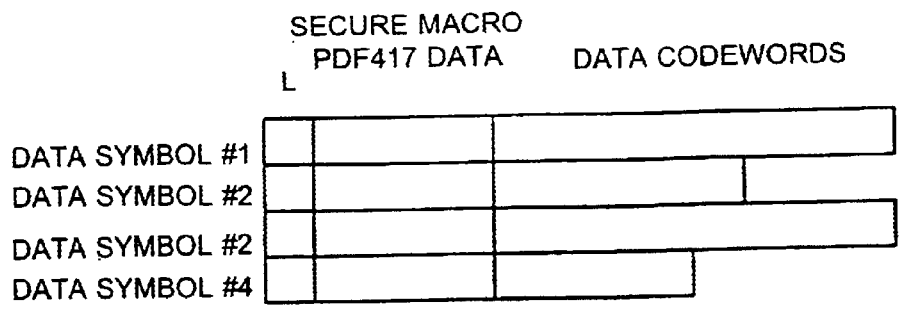
FIG. 8A  VARIABLE-LENGTH SYMBOLS AS ORIGINALLY ENCODED
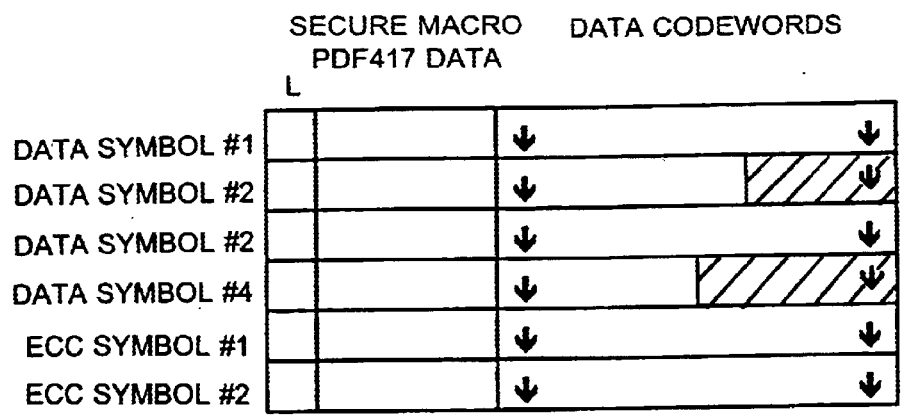
FIG. 8B  VARIABLE-LENGTH SYMBOLS AS ARRANGED FOR CROSS-SYMBOL ECC
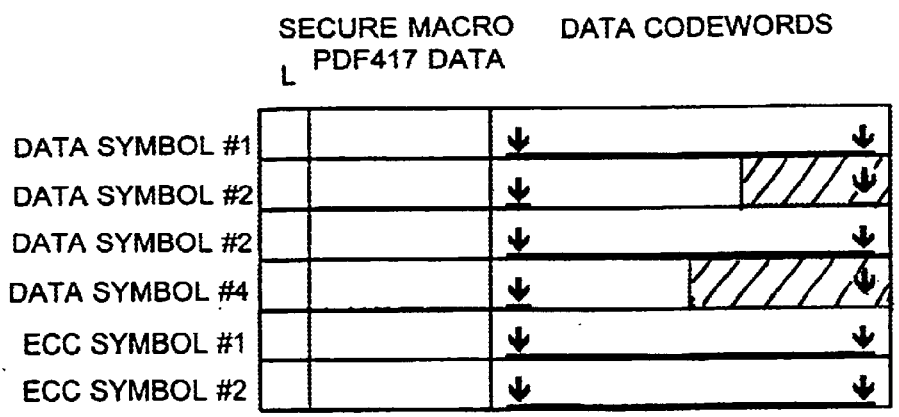
FIG. 8C

*FIG. 10* Omnidirectional 1D Scanning Pattern

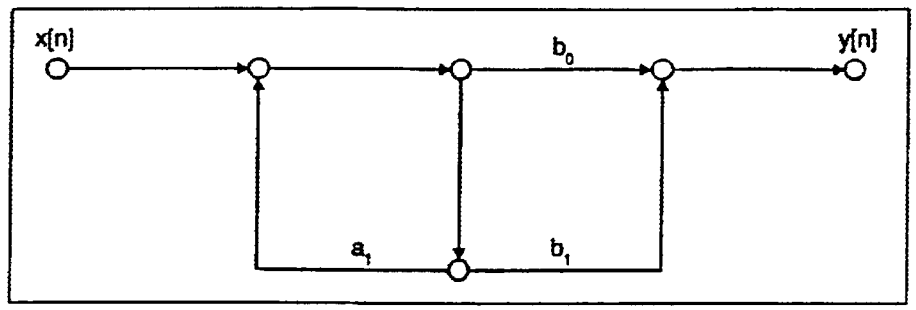
*FIG. 12* Digital Filter Implementation of Smoothing Filter Open-Loop Observer
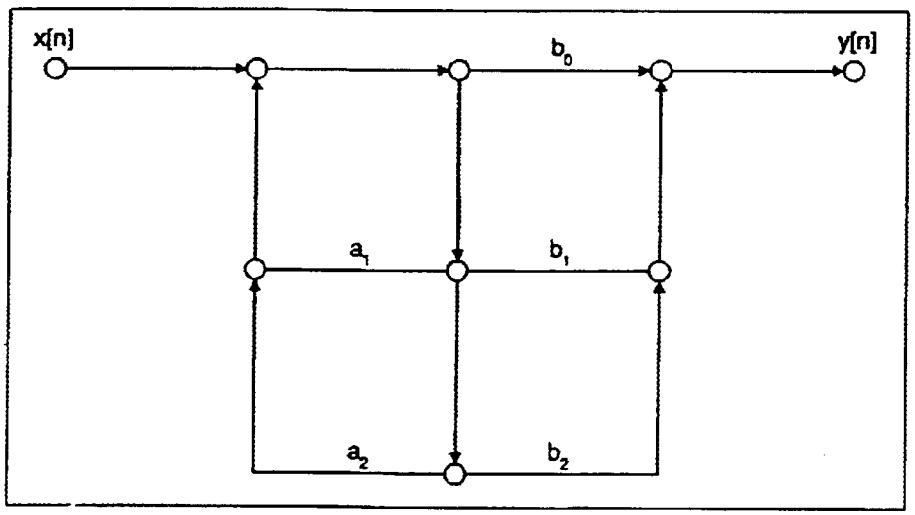
*FIG. 13* Digital Filter Implementation of TBE Open-Loop Observer

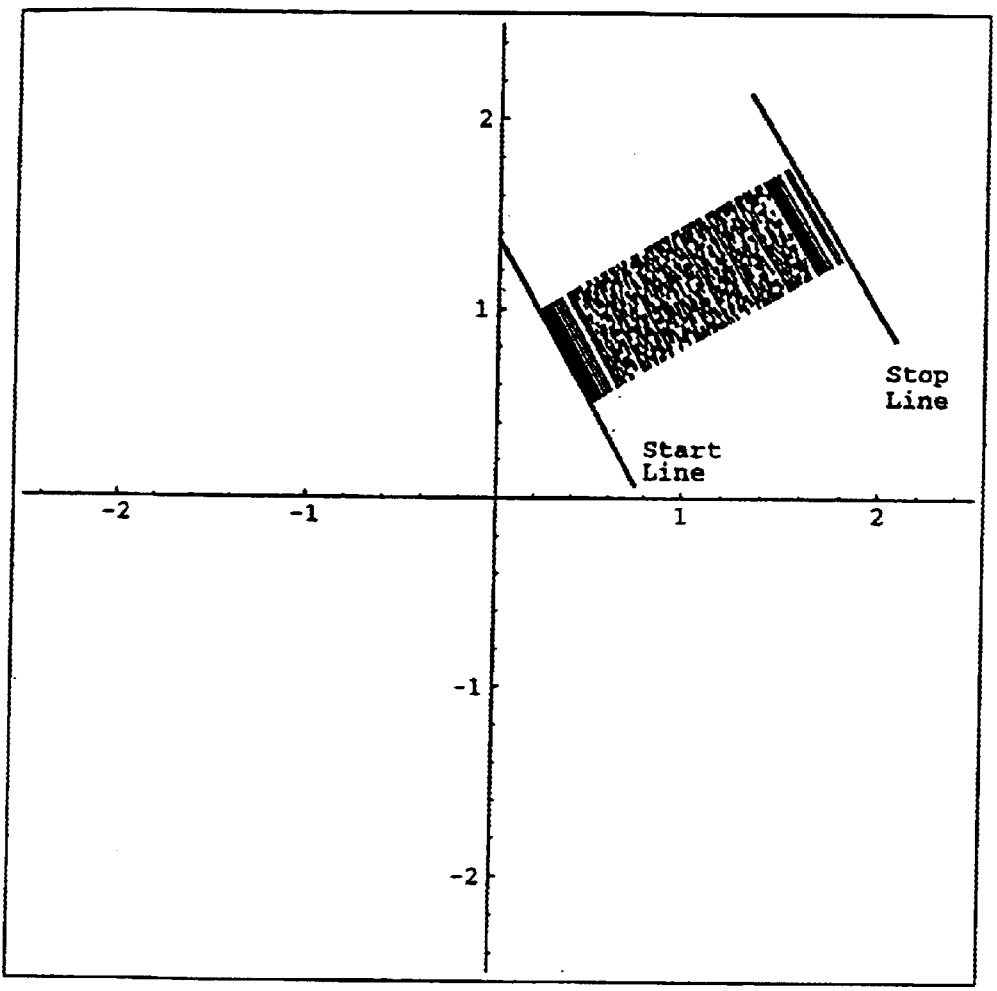
FIG. 14 The Two Lines Along the Start and Stop Patterns of the PDF417 Label.

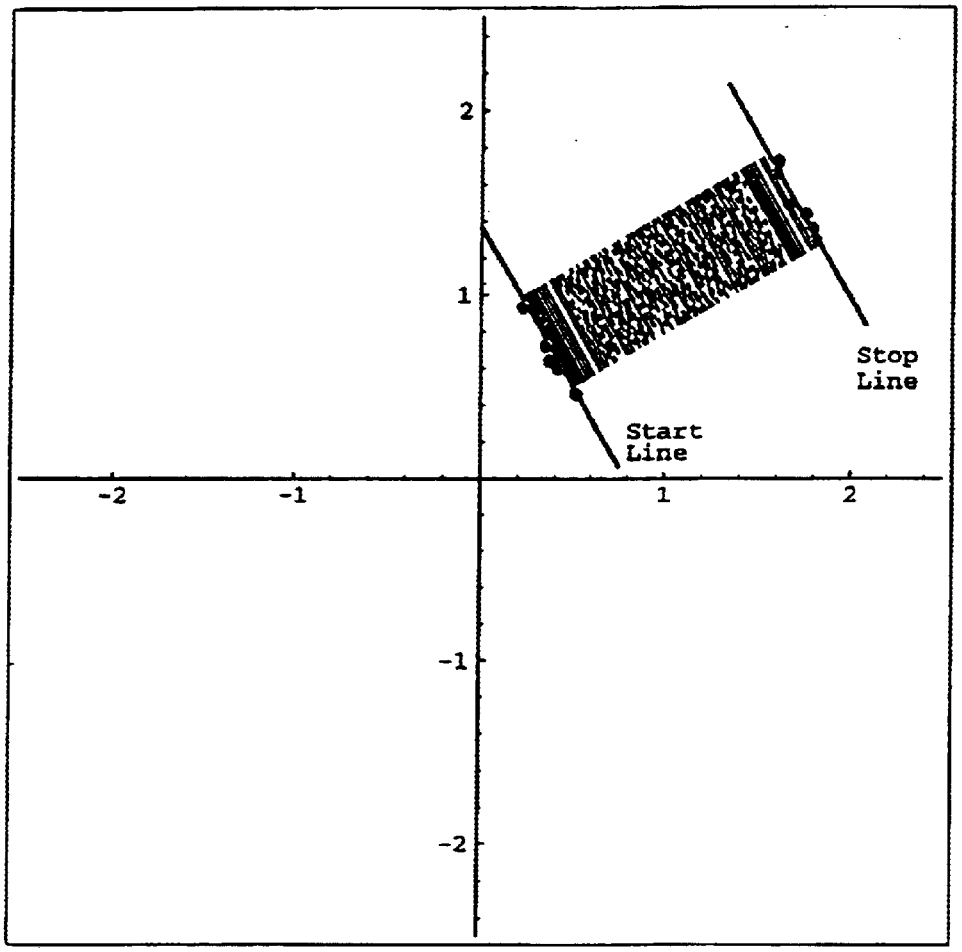
FIG. 15 Fitting Two Lines to the Coordinates of the Detected Start and Stop Patterns

ERROR CORRECTION IN MACRO BAR CODE SYMBOLS

CROSS-REFERENCE TO RELATED APPLICATIONS

This application is a continuation application of and claims priority to U.S. application Ser. No. 09/014,482, filed Jan. 28, 1998, now issued U.S. Pat. No. 6,126,074.

The present invention relates generally to error correction in macro bar code symbols.

This invention further relates generally to the optical scanning of two dimensional bar code symbols and in particular to the optical scanning of a randomly oriented two-dimensional bar code symbol by first determining the orientation of the symbol with respect to the field of view of the scanning device and then rotating the field of view accordingly so as to be aligned substantially with the symbol for scanning and further processing and decoding as known from U.S. Pat. No. 5,523,552 incorporated herein by reference.

"Macro" bar code symbols allow large documents to be encoded into multiple symbols, preferably two-dimensional symbols. If one of those symbols is lost it may not be possible to recreate the document; this cannot be remedied by adding more error correction code words into the individual symbols.

The invention further addresses problems with known error correction systems, in particular where data is encoded across a plurality of symbols using a "macro" code. In known systems, there can be a very high time penalty where individual symbols are lost.

The invention further relates to decoding bar code symbols in which the error correction capability allows the user to prioritise the importance of the codewords within a symbol.

The use of encoded data placed on certain types of records is advantageous in that a large amount of information can be placed in a relatively small area.

Also, encoded information can be kept confidential and revealed only to person having the appropriate decoding apparatus.

Known records that could best utilize the benefits of having encoded data placed thereon are records where the data does not change over the life of the record; or where there are relatively large time gaps before the record or such encoded data become outdated. In such systems such records, which include price tags, package identifiers, or train car identifiers for example, do not require frequent updating of the data. Another alternative was to make the record large enough to accommodate additional encoded data representations for supplementing the information from time to time.

There are several types of records where the benefits of having encoded data thereon were offset by the necessity of frequent updating of the encoded information. For example, health cards and records could beneficially include encoded data because they required large amounts of necessary information and the need for confidentiality. Charge cards, where the remaining available credit could be printed on the card as each purchase is made, could beneficially include encoded data. Admission tickets useful for multiple events could include the used or unused events as encoded data on the ticket. This would include tickets for seminars with several workshops, or an admission ticket to an amusement park that includes several rides and shows. In all of the above instances, the necessity of frequent updating of the encoded information would either result in an oversized cumbersome record, or the frequent replacement of the record with a new record having updated encoded data.

One proposed solution to this is a record which contains a printed portion placed on the record and an information portion including removable information encoded in an error-correctable, machine-readable format.

A printer system for a record containing text in at least a portion thereof, comprises input means for receiving information to be placed onto the record; encoding means, coupled to the input means, for encoding the received information in an error-correctable, machine-readable format; and output means, coupled to the coding means, including means for removing any encoded information other than the received information from a record, and means for removably placing the encoded information on the record.

A reader system for a record having an information area containing removable information encoded in an error-correctable format and text, comprises reading means for extracting the information from the information area; correction means, coupled to the reading means, for performing error correction on the removable information to correct any errors in the extracted information and output.

According to another aspect, bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a "module" or "unit". The bars and spaces are multiples of this module size or minimum width.

The conventional bar code symbol is "one-dimensional" in that the bars and spaces extend only in a single direction. There has been an increasing need, however, for machine-readable symbols that contain more information than conventional bar code symbols. One approach for increasing the information in machine-readable symbols is to reduce the height of the bar codes and stack the bar codes one on top of each other to create a "stacked" or "two-dimensional" bar code. One such two-dimensional bar code is PDF417, which was developed by Symbol Technologies, Inc. The PDF417 symbology utilizes a variable number of codewords which are discrete representations of data. A complete description of the PDF417 code is contained in U.S. Pat. No. 5,304,786, which is assigned to the same assignee as the present invention and which is incorporated by reference herein. Other two dimensional bar code symbologies include Code 1 and Maxicode, which are referred to as matrix codes.

Both one-dimensional and two-dimensional bar code symbols are typically read by optical scanning techniques, such as scanning laser beams, and the resulting electrical signals are then decoded to recover the date encoded in the symbol. In particular, two-dimensional bar codes symbols such as those in the PDF417 symbology are advantageously scanned by a two-dimensional mastering laser pattern, which is comprised of a series of horizontal scans repeatedly swept in a vertical direction, as described in U.S. Pat. Nos. 4,816,661 and 5,235,167, which patents are assigned to the assignee of the present application and are incorporated by reference herein. When scanning and decoding a two-dimensional bar code symbol, however, the horizontal scan lines of the laser raster must be aligned substantially with the horizontal rows of the symbol, usually within ±3°. The laser scan lines form a field of view and are parallel with the horizontally located rows of a PDF417 symbol, which will allow successful decoding.

However, the symbol tilted with respect to the scan lines in the field of view such that the symbol cannot be successfully decoded. Although a two-dimensional bar code such as PDF417 allows some deviation, the orientation of the field of view must still be less than some maximum angle relative to the rows of the symbol.

When using a hand-held laser rastering scanner, it is fairly simple for the operator to physically align the raster pattern in the field of view with the two-dimensional symbol by rotating the reader and/or the object bearing the symbol until the requisite alignment of the field of view is obtained visually and the symbol is successfully read and decoded. There are many applications, however, in which it is desirable to be able to read and decode a two-dimensional bar code symbol that may be randomly oriented without having to manually move the reader such that the field of view is aligned with rows of the symbol. For example, in an industrial environment, the symbol may be located on an object moving along a conveyor belt where the reader views the symbol from above. Thus, the symbol may be in any orientation relative to the field of view of the reader. In addition, in a retail point-of-sale environment, the symbol may be located on an item presented to a cashier for purchase. The cashier typically puts the item bearing the symbol under a presentation scan lamp, which provides the appropriate laser scanning pattern. It is thus desirable in this situation to allow the cashier to quickly present the item under the scan lamp without having to align the symbol with the raster pattern.

Bar code symbol reading devices are also known in the art which are based upon charge coupled device (CCD) imaging technology. For example, a two dimensional CCD array comprised of 512×512 elements may be used to capture an image for the entire target bar code symbol simultaneously, and the electric charge stored in each element as a function of the amount of light sensed by an area covered by each element is shifted out serially to form electric signals for further processing, digitizing and decoding. Image processing techniques allow such a CCD array to be used to read misoriented bar code symbols. For example, U.S. Pat. No. 5,319,181 issued to the assignee of the present invention, describes a technique to implement a CCD camera to capture a PDF417 symbol, store the image data in memory, and perform virtual scanning of the image data to determine the proper orientation of the symbol and enable successful decoding. These techniques, while satisfactory in many applications, do not allow high speed racing since the image memory must be repeatedly accessed in a random access manner. There is thus a need in the art for CCD based bar code symbol reading devices to be able to perform high speed reading of misoriented two dimensional bar code symbols.

One proposed solution set out in U.S. Pat. No. 5,523,552 identified above is to provide a method and apparatus for automatically aligning a field of view of a two-dimensional bar code symbol reading device with a randomly oriented two-dimensional bar code symbol, wherein the symbol comprises a unique locatable pattern located along at least one side thereof, the method comprising the steps of scanning the symbol with a scan line extending through the pattern, detecting the pattern, measuring the length of the pattern detected by the scan line, and rotating by a predetermined amount the scan line about a point central in the field of view. These scanning, detecting, measuring, and rotating steps are repeated for a predetermined number of times. The rotation angle at which the pattern length is smallest is determined as a function of the measured pattern lengths, and the field of view of the symbol reading device is rotated to the determined skew angle so as to be aligned with the symbol for subsequent scanning and decoding.

SUMMARY OF THE INVENTION

It is an object of the invention to overcome or mitigate problems encountered with known arrangements.

It is a particular object to provide a "macro" bar code system capable of recovering the entire code even is where an individual symbol is lost.

It is a further object of the invention to provide an error correction scheme which is quicker than known schemes.

It is a further object of the invention to provide for the select-on of an appropriate security level for a symbol and to provide an adjustable security level, and to allow decoding of a portion of a symbol even when the symbol cannot be completely decoded.

Additional objects and advantages of this invention will be set forth in part of the description which follows, and in part will be obvious from that description, or may be learned by practice of this invention. The advantages of this invention may be realized and attained by means of the instrumentalities and combinations particularly pointed out in the appended claims.

The accompanying drawings, which are incorporated in and constitute a part of the specification, illustrate embodiments of the invention and, together with the general description, serve to explain the principles of the invention.

BRIEF DESCRIPTION OF THE DRAWINGS

FIG. 5A shows an array of information cells in a code;

FIG. 5B shows an array of information cells and correction cells in a code;

FIG. 5C shows an array of information, correction and additional information cells;

FIG. 5D shows an array of information, correction, additional information and projection cells in a code;

FIG. 5E shows the array of FIGS. 5A–D in the form of a two-dimensional symbol;

FIG. 6 shows one type of error correction scheme;

FIG. 7 shows a "secure macro" array layout;

FIG. 8A shows a "secure macro" array including variable length symbols;

FIG. 8B shows a variation of FIG. 8A;

FIG. 8C shows a variation of FIG. 8B;

FIG. 12 is a diagram representing digital filter implementation of smoothing filter open loop observer systems;

FIG. 13 is a diagram representing digital filter implementation of taut band element open loop observer system;

FIG. 14 shows the orientation of a start and stop line along the start and stop patterns of a two-dimensional bar code symbol;

FIG. 15 shows the fitting of a start and stop line to the coordinates of the detected start and stop patterns;

DESCRIPTION OF THE PREFERRED EMBODIMENTS

Reference will now be made in detail to presently preferred embodiments of the invention, examples of which are illustrated in the accompanying drawings.

Code PDF417

Before discussing the method and apparatus for encoding and decoding data in machine readable graphic form, such as the two-dimensional bar code PDF417, it is important to understand the structure of the two-dimensional bar code symbol itself.

Each PDF417 symbol is composed of a stack of rows of bar-coded information. Each row in the symbol consists of a start pattern, several symbol characters called "codewords", and a stop pattern. A codeword is the basic unit for encoding a value representing, or associated with, certain numbers, letters, or other symbols. Collectively, the codewords in each row form data columns.

Figure 1:
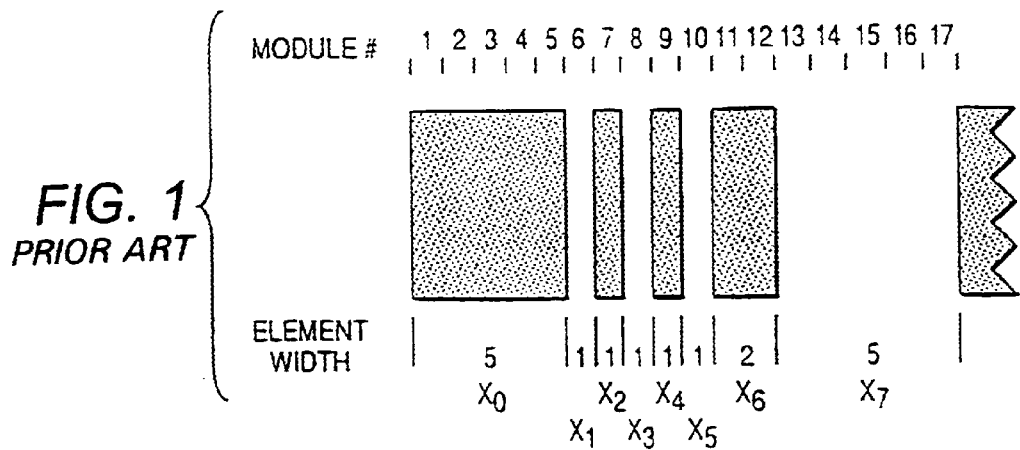
FIG. 1 is a diagram illustrating one example of a codeword in PDF417.

Both the number of rows and the number of data columns of the PDF417 symbol are variable. The symbol must have at least three rows and may have up to ninety rows. Likewise, within each row, the number of codewords or data columns can vary from three to thirty. Each PDF417 codeword consists of seventeen modules or units. There are four bars and four spaces in each codeword. Individual bars or spaces can vary in width from one to six modules, but the combined total per codeword can be defined by an eight-digit sequence, which represents the four sets of alternating bar and space widths within the codeword. This is called the "x-sequence" of the codeword and may be represented by the sequence $X_0, X_1, \ldots X_7$. For example, for an x-sequence of "51111125", the first element is five modules wide, followed by five elements one module wide, one element two modules wide, and the last element five modules wide. This example is illustrated in FIG. 1.

The set of possible codewords is further partitioned into three mutually exclusive subsets called "clusters". In the PDF417 symbol, each row uses only one of the three clusters to encode data, and each cluster repeats sequentially every third row. Because any two adjacent rows use different clusters, the decoder is able to discriminate between codewords from different rows within the same scan line.

The cluster number of a codeword may be determined from its X-sequence using the following formula:

cluster number=$X_0-X_2+X_4-X_6$) mod 9 where "mod 9" is the remainder after division by nine. Referring to the codeword in FIG. 1, the cluster number is calculated as follows:

cluster number=5–1+1–2) mod 9=3

To minimize error probabilities, PDF417 uses only three clusters, even though nine are mathematically possible. Thus, each row uses only one of the three clusters 0, 3, or 6, to encode data, with the same cluster repeating sequentially every third row. Row 0 codewords, for example, use cluster 0, row 1 uses cluster 3, and row 2 uses cluster 6, etc. In general, the cluster number may be determined from the row number as follows:

cluster number=((row number) mod 3)*3

There are 929 codeword values defined in PDF417. These values are 0 through 928. Each cluster presents the 929 available values with distinct bar-space patterns so that one cluster cannot be confused with another.

Figures 2, 3:
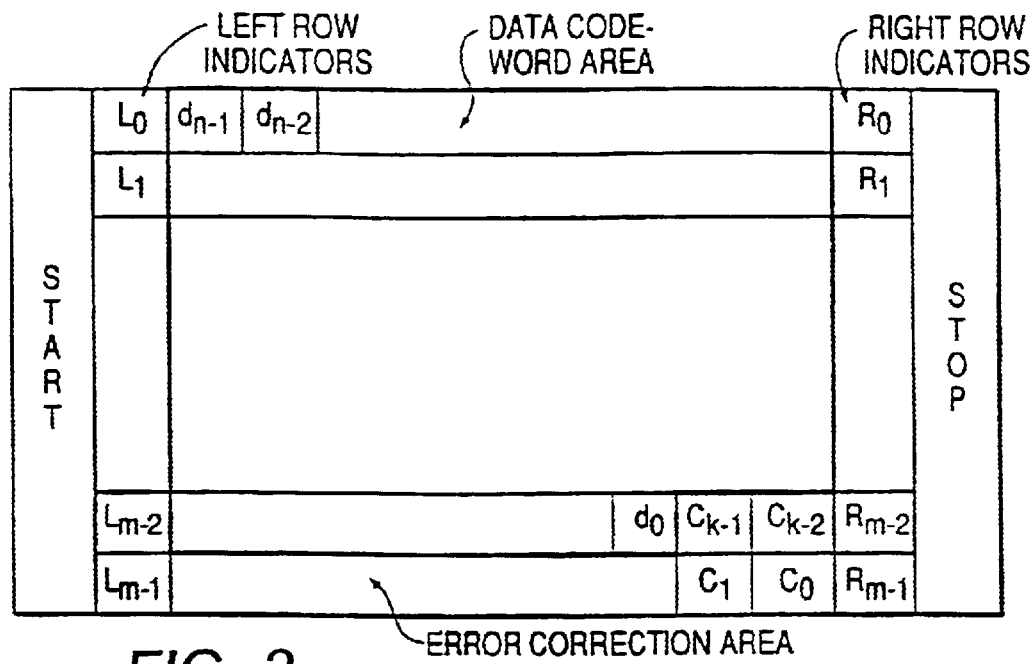
FIG. 2 is a diagram illustrating the overall structure of a PDF417 symbol.
FIG. 3 is a table listing the number of error correction codewords for a given security level in PDF417.

FIG. 2 is a block diagram showing the overall structure of a PDF417 symbol. Each row of the symbol consists of a start pattern, a left row indicator codeword $L_i$, data codewords $d_i$, or error detection/correction codewords $C_i$, a right new indicator codeword $R_i$, and a stop pattern. The minimum number of codewords in a row is three, including the left row indicator codeword, at least one data codeword, and the right row indicator codeword. The right and left row indicator codewords, which are discussed further below, help synchronize the structure of the symbol.

The start and stop patterns identify where each row of the symbol begins and ends. PDF417 uses unique start and stop patterns. The start pattern, or left side of each row, has the unique pattern, or X-sequence, of "81111113". The stop pattern, or right side of each row, has the unique x-sequence of "711311121".

Every symbol contains one codeword (the first data codeword in row 0) indicating the total number of codewords within the symbol, and at least two error-detection codewords $C_0$ and $C_1$. These two error-detection codewords together form a checksum which is two codewords long.

A PDF417 symbol can also encode data with error correction capability. The level of error correction capability, called the "security level", is selected by the user and ranges from 0 to 8. This means, for example, that at level 6, a total of 126 codewords can be either missing or destroyed and the entire symbol can be read and decoded. FIG. 3 is a table showing the relationship between the security level of the PDF417 symbol and the number of error correction codewords $C_i$.

In addition to correcting for missing or destroyed data (known as "erasures"), PDF417 can also recover from misdecodes of codewords. Since it requires two codewords to recover from a misdecode, one to detect the error and one to correct it, a given security level can support half the number of misdecodes that it can of undecoded codewords.

This error correction feature is particularly useful when information in PDF417 format overlays partially erased coded words. This partial erasure creates the possibility that the unerased code portions will distort portions of the encoded information. If that happens, errors can be corrected with the PDF417 two-dimensional bar code.

The row indicator codewords in a PDF417 symbol contain several key components: row number, number of rows, number of data columns, and security level. Not every row indicator contains every component, however. The information is spread over several rows, and the pattern repeats itself every three rows. The pattern for encoding the information in the row indicator can be illustrated as follows:

| | |
|---|---|
| Row 0: $L_0$ (row #, # of rows) | $R_0$ (row #, # of columns) |
| Row 1: $L_1$ (row #, security level) | $R_1$ (row #, # of rows) |
| Row 2: $L_2$ (row #, # of columns) | $R_2$ (row #, security level) |
| Row 3: $L_3$ etc (row #, # of rows) | $R_3$ (row #, # of columns) |

In other words, the left row indicator codeword $L_0$ for the first row 0 contains the row number (0) and the total number of rows in the symbol. The right row indicator codeword $R_0$ for row 0 contains the row number (0) and the number of data columns in the symbol, and so on.

Encoding data into a PDF417 symbol is typically a two-step process. First, data is converted into codeword values of 0 to 928, which represent the data. This is known as "high-level encoding". The values are then physically represented by particular bar-space patterns, which is known as "low-level encoding".

Encoders and decoders are discussed more completely in U.S. Pat. No. 5,243,655, incorporated by reference herein.

The system is particularly relevant to bar code readers such as those disclosed and described in U.S. patent application Ser. Nos. 317,433 and 317,533, and incorporated herein by reference. The readers disclosed in the above patent applications are open system devices designed to read an optically encoded two-dimensional bar code and to convert the light reflected from the pattern into electrical signals representative of the graphic indicia.

Figure 4:
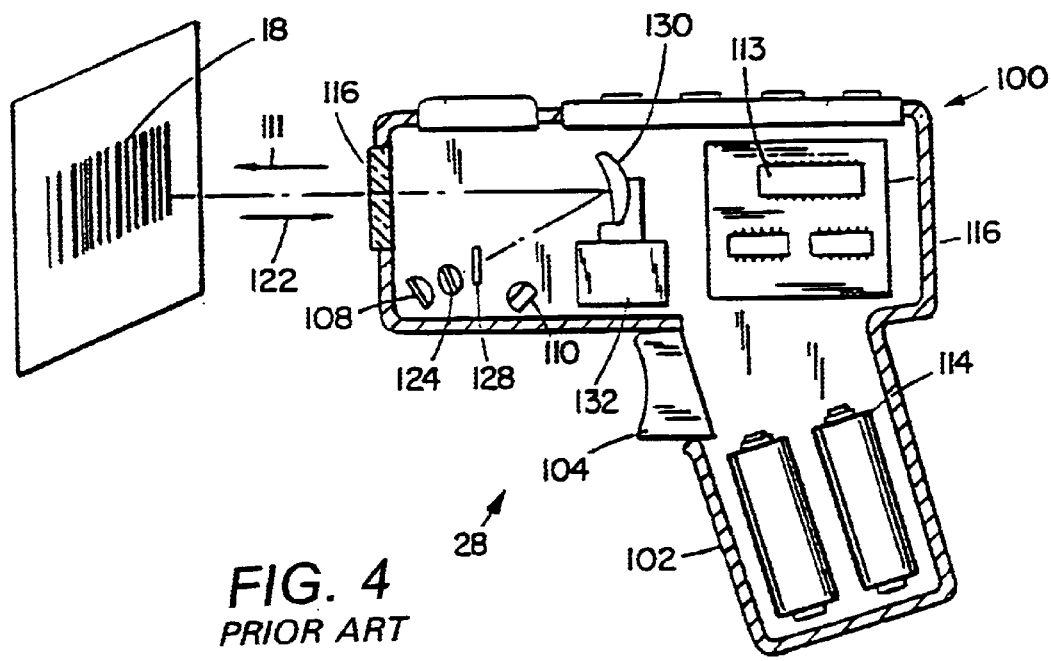
FIG. 4 illustrates a bar code reader implemented as a gun shaped device for reading the records of the present invention.

Referring to FIG. 4, a typical exemplary embodiment of a bar code reader of converting means 28 is implemented as a gun shaped device 100, having a pistol grip type of handle 102. A movable manually actuated trigger switch 104 is employed to allow the user to activate a light beam and detector circuitry, typically after the time when the user has positioned the device to point at the symbol to be read. A light-weight plastic housing contains a laser light source 108, the detector 110, the optics and signal processing circuitry and the CPU 113, as well as a power source or battery 114. A light-transmissive window 116 in the front end of the housing allows the outgoing light beam to exit and the incoming reflected light 122 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches or even further.

The reader 100 may also function as a portable computer terminal, and in such embodiments include a keyboard and a display, such as described in the previously noted U.S. Pat. No. 4,409,470.

As further depicted in FIG. 4, a suitable lens 124 (or multiple lens system) may be used to focus the scanned beam into a scanning spot at an appropriate reference plane. Light source 108 such as a semiconductor laser diode is positioned to introduce a light beam into the axis of the lens 124, and the beam passes through a partially-silvered mirror 128 and other lenses or beam-shaping structure as needed. The beam is reflected from an oscillating mirror 130 which is coupled to a scanning motor 132 which is energized when the trigger 104 is pulled. If the light produced by the source 146 is marginally visible, an aiming light may be included in the optical system. The aiming light if needed, produces a visible-light spot which may be fixed, or scanned just like the laser beam; the user employs this visible light to aim the reader unit at the symbol before pulling the trigger.

The system maximizes the use of available space for encrypting data. The density of the encoded data is such that for a two-dimensional bar code symbol, a minimum of about 1600 characters can be encoded into a space of approximately 5"×½". In addition to being compact, the system provides for high security in the transmission of information.

A low-level decoder may be embodied in a computer program operating on a microcomputer separate from the host computer. The low-level decoder would be preferably connected to the host computer by a standard interface, such as an RS-232 interface, for transmitting the codeword values after they are decoded. Alternatively, the low-level decoder could be embodied entirely in hardware, or a combination of a hardware and software, which is physically located in either the scanner itself or the host computer.

The matrix of codeword values from low-level decoder is decoded into usable data by a high-level decoder, which may be embodied as a separate computer program operating on the host computer. For example, PDF417 has three predefined modes and nine reserved modes. The predefined modes are Binary, EXC, and Numeric. In the Binary mode, each codeword can encode 1.2 bytes. In the EXC mode, the alphanumeric data can be encoded in double density (i.e., two characters per code word), and in Numeric mode, the numeric data can be packed in almost triple density. Therefore, the high-level decoder in the host computer will further decode the codeword values (0–928) from the low-level decoder, depending on the mode, to obtain the actual data embodied in the symbol. The decoded data from the high-level decoder may then be used by a user application program also operating on the host computer 112.

According to an aspect of the invention it is desired to enhance the information carrying capability by using "macro-PDF" technology according to which the information is stored in a plurality of symbols rather than in an individual symbol. The information can then be viewed as a datastream continuing across symbols. Macro-PDF allows large documents to be encoded into multiple PDF-417 symbols. But if any one of these symbols is lost it may be impossible to recreate the document, and this cannot be remedied simply by adding more error correction codewords into each of the individual PDF symbols.

Referring to the arrays in FIGS. 5a to 5e, the invention is described in more detail.

Referring firstly to FIG. 5a, the array is made up of a plurality of cells arranged in two dimensions and having R rows and J columns. Each cell is referenced $i_{1,1} \ldots i_{r,j}$. Each cell represents a codeword comprising a value between zero and a predetermined integer number and is represented by a predetermined pattern in a symbology. The information cells (i-cells) thus represent the information encoded. If the number of i-cells is not sufficient to fill the array, the empty cells are filled with a predetermined value, for example and preferably zero.

Referring now to FIG. 5b error control or correction cells, c-cells, are calculated using an appropriate error control mechanism and arranged in columns below the i-cells in a column-wise calculation. Accordingly, for the first column, the values of the c-cells are calculated wherein the values of the i-cells in the same column. The process is repeated for each column. The c-cells are arranged in additional rows number r+1 to s.

As shown in FIG. 5c, a-cells are added in additional columns referenced j+1 to k. The a-cells record various information, in particular a unique file identification number representing a sequence number of the macro-2-d code, the current row number, the total number of rows (s) and the number of information rows (r). It will be appreciated that the only information that will change between rows is the row number, the other information will be identical for all rows of the same matrix. A further set of columns referenced k+1 to n are added incorporating d-cells. The d-cells are calculated using an error-control algorithm, one row at a time. The d-cells protect the i-cells (or c-cells) and a-cells in the same row. Each of these rows is recorded as an individual 2D symbol and the collection of 2D symbols form the macro 2D symbol which is shown in the s×n array of FIG. 5e. For decoding, the encoding procedure is reversed. Each symbol (corresponding to one row) is decoded first, correcting errors and filling erasures. The decoded i-cells and c-cells are put in a matrix. If some of the rows are missing, or more unlikely decoded in error, the error control code in the columns is used to correct them. Thus the data is fully recovered even when some individual symbols of the macro-symbol are lost.

Yet further improvements are shown in relation to FIG. 6. The basic approach involves the use of M error correcting symbols which can allow up to M macro PDF symbols to be lost. The advantage of this scheme is that it allows the use of the current encoding techniques available for PDF417 and does not require the definition of a new Galois field (of the type well known in PDF technology and relating to the number of codeword values available).

The disadvantage of this scheme is that it is very time intensive. Let us assume that we have a total of M+N symbols and each symbol has about 200 codewords at security level (slev) 5 (62+2 error correcting and detecting codewords). The total number of data codewords will be N*(200−64) and the total overhead will be M*200+N*64 (total codewords=(M+N)200). Even if one of the symbols is lost the number of extra error correction attempts that have to be made to reconstruct the Macro PDF message will be 200−62+M (200−62 along the columns and M along the rows). The total extra time required for this effort will be (138+M) T (slev 5). Assuming Security level 5 error correction time to be 500 ms and the total allowable symbols to be lost to be 5 (M=5, also N assumed to be about 20) the total time for this effort will be 143.5 sec or 71.5 seconds.

In the new proposed scheme according to another aspect of the invention a different and larger Galois field is proposed. For example, let us assume that we choose a Galois field GF(8192). The data symbols are first encoded and printed as normal PDF symbols (N symbols using Galois Field GF (929) at security level 5). Then all the codewords (data and error correction) are encoded using GF(8192) (The error correcting codewords will have values ranging from 0 to 8191). If we allow up to 5 symbols to be lost this implies that we should have an error correction capability of about 1000. Since each character can have 4 digits the total number of numeric characters will be 4000. As we have a packing efficiency (characters per codeword) say of 2.93 this implies that the number of codewords required will be about 1333. Allowing (200−64) codewords per symbol this implies that the number of symbols required would be 1333/146~9. Each of these symbols is also encoded at security level 5.

The total overhead now will be 9*200+20*64 as opposed to 5*200+20*64. But the total number of erasures to be corrected will be only about 1333 which has the time complexity of about 4 times the time complexity of a security level 8 symbol. As the time complexity of a security level 8 symbol (on the same scale as the 500 ms time for slev 5) is about a second, the total decode time will be about 4*1+9*0.5 (9 sec level 5 decodes) ~8.5 seconds plus some additional high level decode time to convert codewords back to the Galois field GF (8192). This scheme can be repeatedly applied on sets of 20 symbols.

The basic scheme allows the advantages of the same Galois Field—no new primitive power tables are required— and less space; an overhead for above example 2280 codewords. On the other hand it has the disadvantages of a long time to decode in, for example 71.5 seconds.

The proposed improvement has a time to decode of for example 8.5 seconds and the disadvantages of a new Galois field and more overhead—for example 3080 codewords.

Yet further improvements can be envisaged according to the present invention, in particular rendering the format of the "secure macro" information discussed above to make it more compatible with existing macro PDF417 specifications.

As discussed above secure Macro PDF417 is designed to extend the error correction process used within a single symbol across a group of symbols. By adding a user-defined number of additional "error correction symbols" to the overall set of symbols printed, the new system becomes tolerant of the loss of entire symbols. Because, as with standard Macro PDF417, each symbol is "tagged" with information to allow its location within the overall set to be known, symbols which are not recovered can be treated as "erasures". Using the same algorithms designed to reconstruct codewords not recovered from within an individual symbol, the extra codewords in the "error correction symbols" are used to "fill in" the missing data symbols.

Because some of the symbols in a Secure Macro PDF417 set contain error correction information rather than data, it is necessary to use a coding scheme which permits the decoder to uniquely distinguish Secure Macro PDF417 symbol sets from Standard Macro PD417 sets. The system proposed to guarantee this uses a previously-undefined Macro PDF417 field to indicate that the data in this set has been encoded using this technique, and to communicate data required to decode it. An additional codeword, number 920, is reserved for use as a pad (filler) codeword.

Conceptually, then, each symbol in a Secure Macro PDF417 set consists of the following information:

---

A portion of the overall data being encoded
A standard Macro PDF417 control block
A Macro PDF417 field containing Secure Macro PDF417 data
The standard per-symbol ECC data.

---

The codewords in a set of symbols can be treated as if they were members of a two-dimensional array, as shown in FIG. 7. In this diagram, each individual symbol is represented by a single row in the matrix. Successive rows in the matrix represent successive symbols in the set.

Secure Macro PDF417 imposes the following changes to the standard Macro PDF417 system:

---

Optional field information is appended to the data stream, rather than being placed after the Macro PDF417 Control Block. The only field that appears after the Macro PDF417 Control Block is the Secure Macro field.
The Secure Macro field information is mandatory, and must appear in each symbol.

-continued

The Macro PDF417 Terminator codeword (922) is no longer required at the end of the stream, but may optionally be included.
The decoder does not reset its state to Text Compression (low-level coding) mode at the beginning of the second through N'th symbols. Rather, the internal state for the decoder persists across symbols. This means that the codewords in the data symbols may be treated as a single continuous stream that is "packetized" into the individual symbols.

The encoding process is summarized as follows:
1. The data to be represented is encoded in any manner deemed appropriate to the application and which will be familiar to the skilled person. This can involve either standard low-level coding techniques (Binary Compression), Text Compression and Numeric Compression) or appropriate GLI'S.
2. Any desired optional Macro PDF417 fields are calculated and appended to the codeword stream from #1.
3. The size of the individual symbols to be used are calculated in any appropriate manner and the ECC level for the individual codewords chosen.
4. The individual data capacity of the data symbols is determined by subtracting from the total symbol size the ECC codewords and the space required for the Macro PDF417 Control Block and the Secure Macro field.
5. The total number of Data Symbols is calculated based on the individual capacity of the symbols and the number of codewords in the stream calculated in #1 and #2.
6. The number of ECC symbols is determined based on the application. Typically, this will be a function of the total number of Data Symbols, the overall data integrity desired and the ECC level of the individual symbols.
7. The codeword stream calculated in #1 and #2 is distributed across the Data Symbols.
8. The codeword stream is padded, as required to fill the last symbol, with 920 codewords. (This step is optional, but recommended)
9. The data codewords for each ECC Symbol are calculated using standard Reed-Solomon techniques which will be familiar to the skilled person, using the corresponding data codewords from each of the Data symbols as the input data. (In other words, the fifth data codeword in each ECC Symbol is calculated from the collective fifth codewords from the Data Symbols)
10. The Macro PDF417 Control Block data and Secure Macro field data is appended to the end of each symbol.
11. The ECC codewords for each Data and ECC Symbol are calculated using the standard ECC procedure known to the skilled person.

Note that only the data portions of the ECC symbols are calculated using the cross-symbol ECC procedure (step 9). The symbol length codeword (first codeword in the symbol), Macro PDF417 control block and Secure Macro field are generated using normal (non-ECC) procedure (step 10), and the ECC codewords in the ECC symbols are generated using the same intra-symbol ECC procedures as for the data symbols (step 11).

This encoding system eliminates the restriction that the decoder reinitialize to the Text Compression (low level coding) Mode at the beginning of each new symbol. This greatly simplifies the encoding process, as it permits the encoder to process the entire input set in the most efficient manner possible, without having to concern itself with the effects of Symbol boundaries.

When decoding the data, the decoder is to treat the entire data codeword set as a continuous stream, also without regard for symbol boundaries. This implies that the encoder is free, should it so desire, to "break up" codeword sequences normally considered indivisible (e.g. GLI invocations, groups of 5 Binary-Compression-Mode-encoded codewords, etc.) across symbol boundaries.

If the application desires to include any of the Macro PDF417 optional fields, this information may be appended to the end of the data stream. Each such field is encoded as standard (see the AIM specification) (923+Field ID+value). Note that the data in the Secure Macro field largely eliminates the need for the "Segment Count" optional field.

For applications in which the total number of symbols (data+ECC) does not exceed 900, the Secure Macro PDF417 field has the following format:

Codeword

| Index | Values | Meaning |
|---|---|---|
| 0 | 923 | Field tag |
| 1 | 008 | Field designator - Secure Macro PDF417 |
| 2 | 1–899 | Number of data symbols in this set ("DCOUNT") |
| 3 | 1–899 | Number of ECC symbols in this set ("ECOUNT") |

The position of a symbol within a set is determined by the Segment Index portion of the Control Block. The data symbols will have Segment Index values ranging from 0 through DCOUNT−1, inclusive. ECC symbols will have Segment Index values between DCOUNT and DCOUNT+ECOUNT−1, inclusive.

For applications in which the total number of symbols (data+ECC) is greater than 900, the data must be broken up into Secure Macro PDF417 groups. Each Secure Macro PDF417 group must have a total number of symbols (Data+ECC) less than or equal to 900. There may be up to 900 such groups in a file, however the total number of symbols in the entire set may not exceed 99,999.

In this situation, the Secure Macro PDF417 field has the following format:

Codeword

| Index | Values | Meaning |
|---|---|---|
| 0 | 923 | Field tag |
| 1 | 008 | Field designator - Secure Macro PDF417, Long form |
| 2 | 1–899 | Total number of groups minus one (total number of groups is one more than the value of this codeword) |
| 3 | 0–899 | Index number of this group |
| 4 | 1–899 | Number of data symbols in this group ("DCOUNT") |

-continued

| Index | Values | Meaning |
|---|---|---|
| 5 | 1–899 | Number of ECC symbols in this group ("ECOUNT") |
| 6–7 | | Segment Index value of the first symbol in this group |

The ECC symbols in each group correct the data symbols in that same group.

The position of a symbol within a set is again determined by the Segment Index portion for the Control Block. The data symbols in a group will have Segment Index values ranging from FIRSTSYM through FIRSTSYM+DCOUNT−1, inclusive. ECC symbols will have Segment Index values between FIRSTSYM+DCOUNT and FIRSTSYM+DCOUNT+ECOUNT−1, inclusive.

Under normal circumstances, each of the symbols in a Secure Macro PDF417 set will have the same number of data and ECC codewords. There is no reason, however, why an application could not choose different values for different symbols, subject to the following mandatory restriction: The number of data codewords in each of the ECC Symbols must be at least as large as the maximum number of data codewords in any of the Data Symbols. This restriction is necessary to ensure that the cross-symbol ECC calculations can be carried out properly (step 9 above). In applications where some Data Symbols do have fewer data codewords than others, the "missing" data codewords will be treated as being a special pad value (920) for purposes of the cross-symbol ECC calculations.

FIGS. 8a and 8b show a hypothetical set of four data symbols and two ECC symbols. The second and fourth data symbols have a smaller number of codewords than the first and third.

FIG. 8c shows the same set after the cross-symbol ECC calculations. The shaded portions of the second and fourth symbol indicate the area padded with 920 codewords for the purposes of the ECC calculation.

Figure 8D:
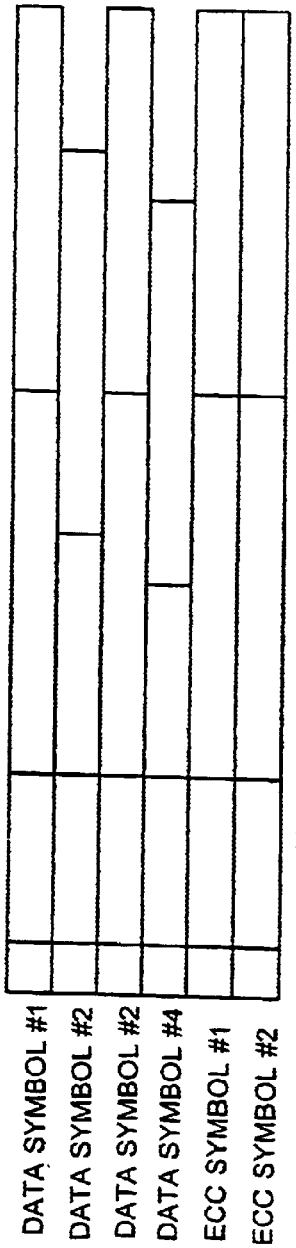
FIG. 8D shows a variable length symbol set as printed.

FIG. 8d shows the final symbol set as it might be printed.

Although the number of data codewords in an ECC symbol must meet the restriction mentioned above, there is no corresponding restriction on the number of ECC codewords in any symbol in the set. In a typical application, the entire Secure Macro PDF417 set will be encoded at a fixed ECC level. There is no reason, however, that prevents ECC symbols or data symbols from using varying ECC levels. The ECC level of an individual symbol is indicated in the row indicator codewords as with standard Macro PDF417 and non-macro PDF417.

It is worth noting that the traditional approach of reducing the size of the last symbol in a Macro PDF417 group does not carry over well in this system, as the last data symbol is not the last symbol in the overall set, and the ECC symbols (appearing last) will typically be as large as the largest data symbol. Although the order of the symbols could be rearranged to put the ECC symbols first, the additional complexity for the encoder and potential performance penalty on the decoder does not appear to justify this change. As a result, a typical implementation will use uniform symbol sizes. If the last data symbol has fewer data codewords than the previous symbols, it can be padded either with extra ECC codewords, with dummy codewords, with the special "pad" codeword defined earlier, or with any combination of these.

The cross-symbol ECC codewords, i.e. the data portion of the ECC symbols, will be calculated (following step 9 outlined above) using the same procedures as are used to perform ECC calculations on individual symbols. The relevant steps will be familiar to the skilled person and are discussed only briefly below. More specifically, a file with n data codewords and k ECC codewords will use a generator polynomial of the form:

$$g(x)=(x-3)(x-3^2)(x-3^3) \ldots (x-3_k)$$

$$g(x)=\alpha_0+\alpha_1 x+\alpha_2 x^2+ \ldots +\alpha_{k-1}x^{k-1}+x^k$$

The original data will be treated as a collection of polynomials of degree n−1

$$p(x)=d_0+d_1 x+d_2 x^2+ \ldots +d_{n-2}x^{n-2}+d_{n-1}x^{n-1}$$

where $d_{n-1}$ is the $i^{th}$ codeword from the first Data symbol and $d_0$ is the $i^{th}$ codeword from the last Data Symbol (or the value 919, if the appropriate data symbol has fewer than i codewords). The data in the ECC symbols will correspond to the coefficients of the polynomial:

$$c(x)=\text{complement remainder } \underline{p(x)}x^k$$

$$c(x)=c_0+c_1 x+c_2 x^2+ \ldots +c_{k-2}x^{k-2}+c_{k-1}x^{k-1}$$

where $c_{k-1}$ becomes the $i^{th}$ codeword in the first ECC symbol and $C_0$ becomes the $i^{th}$ codeword in the last ECC symbol.

Because the number of ECC codewords is not restricted to a few specific values, as in intra-symbol ECC calculations, encoding applications will probably need to be able to calculate the appropriate generator polynomial "on the fly". Other than this, however, the cross-symbol ECC procedure can use the same basic algorithm as the individual symbol ECC procedure, using the appropriate values of n, k and $a_j$.

Particular aspects for the invention relevant to existing specification requirements are as follows:

1. Change in Format from Previous Version

This represents an attempt to be more compatible with the current Macro PDF417 specification.

2. Use of Field Designator Values 008 and 009

Field designator value 007 is reserved in anticipation of proposing the addition of persistence to the current Macro PDF417 specification through the use of a "tag" field using value 007.

3. Limitation on Maximum Group Size

The ECC algorithms used in the current PDF417 standard will only operate over a total number of codewords less than or equal to 929. This places an upper limit of 929 on the number of data symbols plus ECC symbols involved in a single ECC calculation. Restricting the data portions of the header to values less than 900 is in keeping with the traditional interpretation of values above 899 as control, rather than data, codewords. Since the total number of symbols is restricted to 929 in any event, it is not proposed to use an extended coding technique, involving adding additional codewords to the Secure Macro PDF417 Data, in order to recover the additional 29 (~3%) symbols.

4. Persistence of Character-level Coding Across Symbols

The current system of having the decoder reset to the default coding mode at the beginning of each Macro PDF417 symbol imposes an extreme level of complexity on the standard Macro PDF417 encoder software, as the software must constantly encode forward, then "back up" when it finds that the current encode session crosses a symbol boundary. Having to resynchronise the encoder back to the data also typically introduces extra codewords into the stream, increasing the size of the overall data. Treating the entire data area as a stream of codewords that is "packetized" as a separate, completely disconnected operation has significant benefits from an encoder simplicity point of view. The major limitation in this approach is that it eliminates the ability of the decoder to fully-decode, and transmit in real time, symbols that are scanned out of order, since the context of an individual symbol cannot be determined without knowledge of the previous stream. This mode of operation ("transmit symbols as scanned") is not however currently believed to be commonly in use. In addition when Secure Macro PDF417 is used, such symbols would still need to be fully buffered, because all fully-recovered symbols would be needed to assist in the recovery of symbols that were either not scanned or that were damaged beyond repair. Therefore, there is, in reality, no penalty to the decoder for this change in encoding philosophy. This is, of course, a potentially significant memory-size penalty to the decoder to implement Secure Macro PDF417 at all for this same reason. Once having decided in favour of Secure Macro PDF417, however, this choice of encoding style imposes no additional penalty.

5. Separation of Secure Macro PDF417 Data from Macro PDF417 Fields

It is obvious that the Macro PDF417 fields, if present, should be protected against loss in the same manner as data in the symbols. Where this not the case, loss for the symbol that contained the field information would cause the loss of this information. This implies that the optional field information be located in the "data" portion of the symbols to be covered by the cross-symbol ECC calculations or that a separate, more complicated procedure be used to protect this information. The simplest solution to this is to completely decouple the two, treating the field information exactly like other data. Once having made this decision, the field information is encoded using the existing techniques, since this eliminates the need for "separate but equal" encoding and decoding software.

6. Use of 920 as a Pad Codeword

This choice is arbitrary as long as no codeword that has meaning to the decoder is used, as it then becomes impossible to distinguish between a pad codeword and a "real" codeword, and is based solely on the fact that 920 is the largest currently-reserved meeting this requirement. Alternatively one can use 000 as the pad value. The problem that then arises is the possibility that a "short" data symbol would be one that needed to be reconstructed using the ECC symbols. The ECC algorithms, since they operate on padded symbols, will recover the pad words as well as the data words. It therefore becomes essential that pad words can be distinguished from "real" data words. This would not be possible with a 000 pad. It is also not possible to use codeword 900 or similar as a pad because this is not consistent with the desire to make the encoding persistent across codewords, since it would not be possible to distinguish between a "pad" added by the ECC algorithm and a "real" 900 embedded in the data.

Figure 9:
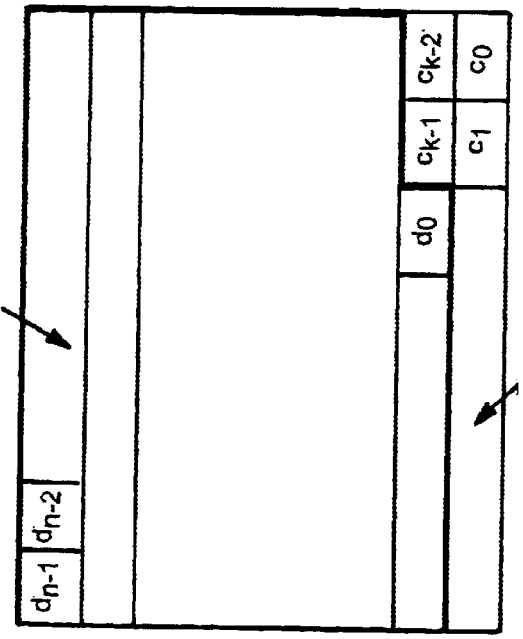
FIG. 9 shows a revised code symbol format.

A further symbology which is a variation of PDF417 is shown in FIG. 9. According to this symbology, in each symbol as discussed above with reference to FIG. 2, the start and stop columns, and the left and right row indicators are deleted. Accordingly the first element in the symbol is a code word not a start character.

The 2D symbology discussed above can be incorporated into a data card. The 2D symbol is printed or graphically imaged on the card allowing the information stored within the symbol to be portable and easily accessed for presentation/reading as required.

The following discussion refers to the following references using a square bracket convention:

[1] R. Bridgelall, J. Katz, and D. Goren, Symbol scanning system and method having adaptive scan pattern generation. U.S. Pat. No. 5,478,997, Dec. 26, 1995.

[2] R. Bridgelall, J. Katz and D. Goren, Rotatable 2D scan element. Symbol Docket No. 064XV, 1993. U.S. Pat. No. 5,504,316

[3] S. J. Shellhammer, PDF Scan Lamp: Determination of PDF417 Rotation Angle using a rotating single Line Scanner. Symbol docket No. 0259, May 17, 1993. U.S. Pat. No. 5,523,552

[4] T. Kailath, *Linear Systems.* Prentice-Hall, 1980.

[5] R. E. Crochiere and L. R. Rabiner, *Multirate Digital Signal Processing.* Prentice-Hall, 1983.

[6] A. V. Oppenheim and R. W. Schafer, *Digital Signal Processing.* Prentice-Hall, 1975.

[7] Automatic Identification Manufacturers, *Uniform Symbology Specification:* PDF417.

[8] H. W. Sorenson, Parameter Estimation: Principles and Problems. Marcel Dekker, 1980.

[9] J. J. Dongarra, J. R. Bunch, C. B. Moler and G. W. Stewart, *LINPACK User's Guide.* Society for Industrial and Applied Mathematics, 1979.

One of the limitations of all the current PDF417 laser scanners is that the scanner must be aligned with the bar code to within about ±5°. The Ultra scanner described in references [1,2] can produce a raster pattern rotated at any angle. It is also possible to offset that rotated raster pattern in both the x and y direction. Being able to rotate the raster pattern to any angle makes it possible to read a PDF417 bar code that is not aligned with the scanner. To make such a system useful it is necessary for the scanner to automatically determine the rotation angle of the bar code as well as the horizontal and vertical offsets, and then produce a raster pattern rotated at the proper angle and offset from center correctly. The purpose of this disclosure is to describe a system for determining the rotation angle as well as the vertical and horizontal offsets.

A previous disclosure has been filed to solve a special case of this problem in a different way [3]. This disclosure describes an improved method that does not require a special scanning mode for determining the bar code location but can use the standard omnidirectional pattern for reading 1D bar codes [1,2]. Also, the previous method was designed to compensate for unknown rotation angle but required the bar code to be near the center of the scanner field-of-view. The method described in this disclosure does not have the same limitation and will work with the bar code anywhere in the scanner field of view. Also, this method determines not only the angle of rotation of the bar code but also the bar code location in the field-of-view.

This new method consists of two parts. The first part involves a method of determining the laser beam location at any time and then recording the (x,y) co-ordinates when the PDF417 start or stop patterns are detected. The co-ordinates of the detected start and stop patterns are recorded in two lists. When enough co-ordinates are recorded that data is sent to the second process. The PDF417 bar code position estimator takes these two lists of co-ordinates for the detected start and stop pattern and estimates the position of the PDF417 label in the field-of-view. Section 1.1 explains how to track the location of the laser beam. Section 1.2 describes how the PDF417 position estimator works.

1.1 Laser Beam Tracking

Figure 10:
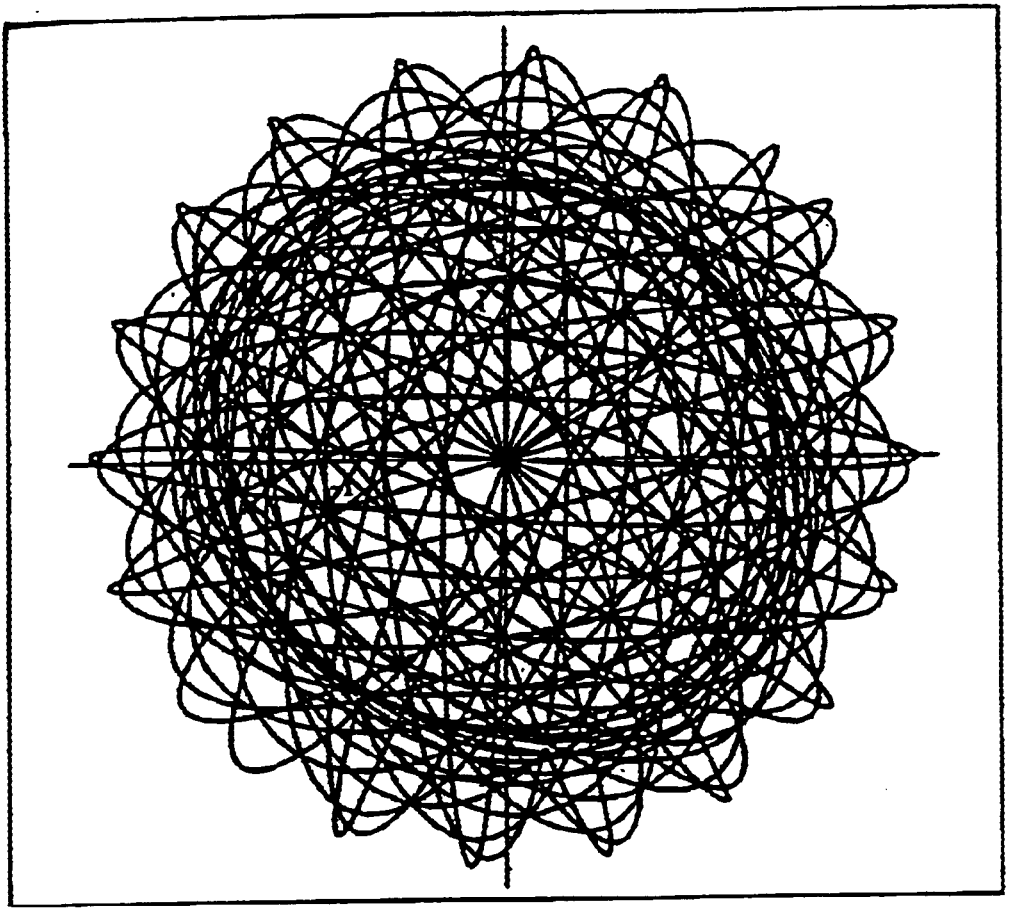
FIG. 10 shows an omni-directional one-dimensional scanning pattern.

In order for the scanning system to automatically determine the location of the PDF417 bar code in the field-ofview it is necessary to know the location of laser beam as it crosses a unique pattern in the bar code. In [3] a special scanning pattern was used where a single line was rotated through a sequence of known angles. The width of the PDF417 start and stop pattern could be measured at each angle. The variation in the width of the start and stop pattern as a function of the rotation angle of the beam was used to estimate the PDF417 bar code rotation angle. That system was designed for a bar code that is centered in the scanner field-of-view. The method proposed in this disclosure is a much more general method of determining the laser beam location. No special searching pattern is required and we can determine the actual (x,y) coordinates of the beam not just the angle of the scan line. We use the omnidirectional pattern used for decoding 1D bar codes [1,2] as shown in FIG. 10.

Since this pattern is used the system can simultaneously determine the PDF417 location and attempt to decode 1D bar codes. This way the scanner is easier to use since it stays in the omnidirectional 1D pattern and if a 1D bar code is presented then it will be decoded and if a PDF417 bar code is presented then the system will detect it, determine the rotation angle and vertical and horizontal offsets, and then automatically produce the appropriate raster pattern for reading the PDF417 label.

The proposed method is based on the concept of an open-loop observer [4]. An observer is a digital model of a physical system, or part of a system, to estimate all or some of the states of the system. If the output, or some of the states of the actual system, are fed back into the observer then it is a standard observer (or closed-loop observer). If however none of the states or outputs of the actual system are fed back to the observer then the observer is an open-loop observer. In the scanner we do not know the laser beam position, which is the output of the system, so we can not use it in any feedback. We may or may not have some sort of velocity feedback which if available may be feedback to the observer.

There are several problems with an open-loop observer. First, the initial conditions of the observer may be totally different than those of the actual system. However, if the system is stable the error in the initial conditions will decay to zero [4]. If one is willing for the error in the initial conditions to decay away then this is not an issue. Second, if the model is incorrect then in an open-loop observer there is not any feedback mechanism to compensate for small modelling errors. Therefore we need a fairly good model of the actual system. This model can be obtained when the system is being calibrated in the factory.

Figure 11:
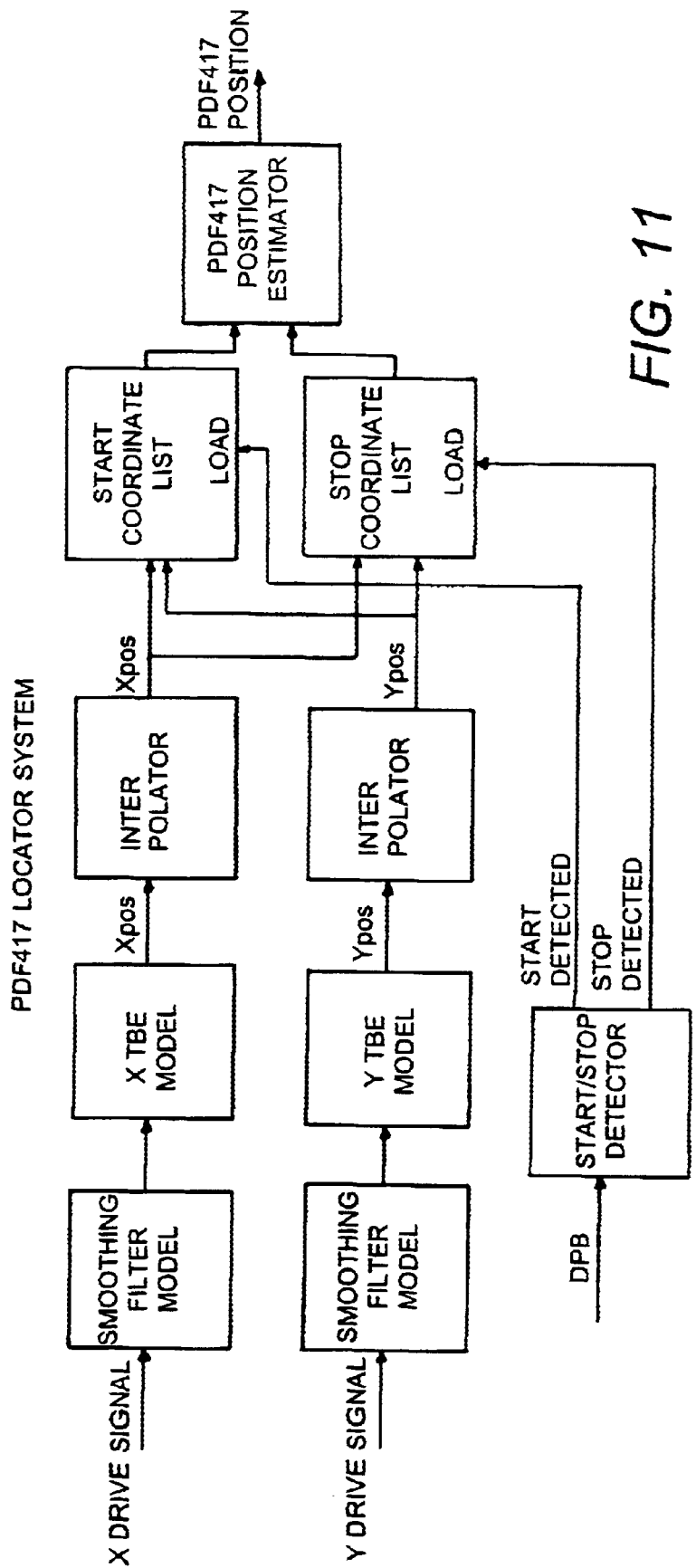
FIG. 11 shows a block diagram of a locator system.

The laser beam position tracker of [1,2] takes its inputs from the digital motor controller and then models the Taut Band Elements (TBEs) as well as analog smoothing filters. The output of the observers (digital model) are (x,y) coordinates of the laser beam position. There will be two observers: one for the TBE controlling the y-dimension (as well as the smoothing filter). FIG. 11 shows a block diagram of the overall system.

Usually the sampling rate used in generating the TBE drive signals is about 8 to 16 times the highest frequency of the drive signals. If the sampling frequency is say 16 times the highest drive frequency then there are 8 sample per scan line. This is more than enough for producing a good quality drive signal. However, gives a very infrequent update of the laser is beam position estimate. The laser beam position will be used to determine the start and stop location and if it is only updated 8 times per scan it gives only a very course sampling of the laser beam position. To improve the resolution we need to fill in values between those samples. This is done using a digital interpolator [5]. By using such an interpolator the laser beam position estimator will have very fine temporal and spatial resolution.

The open-loop observer for the smoothing filter and the TBE are implemented as digital filters [6]. The smoothing filter is a simple (usually first-order) analog low-pass filter. If the transfer function of the smoothing filter is $H_{sm}(s)$ and the sampling frequency used in producing the drive signals is $f_s$ then we can obtain the transfer function of the digital filter model of the smoothing filter, $H_{sm}(z)$, using the bilinear z-transform [6]

$$s = 2f_s \frac{1-z^{-1}}{1+z^{-1}}. \tag{1}$$

If $H_{sm}(s)$ is first-order, then so is $H_{sm}(z)$ and it can be implemented, in signal flow graph notation, as shown in FIG. 12. The filter coefficients are given by $H_{sm}(z)$.

The TBE is a mechanically resonant device that can be modelled as a second-order system, $H_{tbe}(s)$. The digital filter model of the TBE can be obtained once again using the bilinear z-transform (1). The digital filter model of the TBE can be implemented as a second-order digital filter as shown in FIG. 13. The filter coefficients are given by $H_{tbe}(Z)$ The digital interpolator can be implemented in numerous ways. We need to increase the sampling frequency significantly (e.g. by approximately 32) but the exact sampling frequency is not important as long as it is high enough. Because of these requirements it makes sense to implement the interpolator as a cascade of interpolators where each individual interpolator increases the sampling rate by a factor of two. This leads to a computationally efficient implementation. Crochiere and Rabiner [5] explain how to design and implement such digital interpolators.

While the open-loop observers for the x and y coordinates are tracking the laser beam position the start and stop detectors are searching through the Digital Bar Pattern (DBP) trying to match the start and stop patterns. The DBP is the reconstructed bi-level signal which the digitizer produces from the received optical signal. The start and stop detectors take eight elements (four bars and four spaces) at a time and try to match them to the start and stop patterns. This can be done be decoding the eight elements and comparing them to the start and stop sequences using the standard decode algorithms [7]. There are other possible ways of detecting a PDF417 start and stop pattern. One could compare group the 8 values together in a vector and compare the vector to the vector representing the PDF417 start and stop patterns. The thing that matters is that the PDF417 start and stop detectors can distinguish the data that comes from scanning the start and stop patterns from the data that comes from scanning the other parts of the bar code or from other graphics in the field-of-view. When a start or stop pattern is detected the coordinates of the laser beam at that time are recorded in a list.

Once we have collected a long enough list of detected start and stop pattern coordinates those lists are passed to the PDF417 position estimator.

1.2 PDF417 Position Estimator

The goal of the PDF417 position estimator is to use the lists of detected start and stop coordinates to determine the location of the PDF417 label within the field-of-view. We will assume that the PDF417 label can be placed anywhere within the field-of-view of the scanner and can be rotated at any angle relative to the scanner. Determining the rotation angle is the most critical issue since to decode a PDF417 label the raster pattern must be aligned with the label to within about ±5°. The exact location of the label is not as critical since the raster pattern is usually designed to overscan the label in both the horizontal and vertical dimensions of the label.

To estimate the position of the bar code it is necessary to parameterize the location of the bar code. Here, we propose representing the bar code as two lines in space. The first line is parallel to the bars of the start pattern and runs along the edge of the bar code just touching the start pattern. The second line is similar, just touching the stop pattern. FIG. 14 illustrates the two lines running along the start and stop patterns. Once you estimate the parameters of those two lines you can calculate the rotation angle of the bar as well as the vertical and horizontal offsets. This method is described in Section 1.3.

The parameter of the start and stop pattern lines can be estimated either separately or jointly. Estimating them separately is a little simpler but estimating them jointly is more effective and requires less start and stop coordinates to obtain an accurate estimate. Section 1.2.1 explains how to estimate the parameters of the start and stop lines separately, while Section 1.2.2 describes how to estimate the parameters of both lines jointly.

1.2.1 Estimating the Start and Stop Positions Separately

In this section we describe how to estimate the parameters of a line along either the start or stop pattern of the PDF417 bar code. Since the method is the same for both lines we explain it once and the method will be repeated for both the start and stop lines.

We begin with a set of (x,y) coordinates that we obtain using the open-loop observer and the PDF417 start and stop detectors as described in Section 1.1, $$\{(x_1, y_1), (x_2, y_2), \ldots (x_n, y_n)\}. \quad (2)$$

The goal is to fit a straight line to this set of coordinates.

A straight line is usually represented by an equation for y as a function of x, parameterized by the slope of the line and the y-intercept, $$y=ax+b \quad (3)$$

where a is the slope and b is the y-intercept. This is appropriate as long as the line is not a vertical line, which leads to an infinite slope.

To avoid this pathological case we must first check to make sure the slope is not too large. If the slope is too large we can exchange the role of x and y and write x in terms of y, $$x=ay+b \quad (4)$$

where now a is the inverse of the slope of the line and b is the x-intercept.

To determine whether we use Equation 3 or Equation 4 we make a rough estimate of the slope of the line and then select the best parametric equation for the line. To do this we let, $$\Delta x = \left| \max_i x_i - \min_i x_i \right| \quad (5)$$

$$\Delta y = \left| \max_i y_i - \min_i y_i \right|. \quad (6)$$

If $\Delta y \geq \Delta x$ then use Equation 3 if not use Equation 4.

We will explain the method assuming Equation 3 was used. If not, exchange the role of x and y and the same method will work.

For each of the detected coordinates of the start (stop) pattern given in Equation 2 substitute them into Equation 3 giving, $$y_i=ax_i+b \; i=1,2 \ldots n \quad (7)$$

This can be written as a linear observations equation, $$(x_i \; 1)\binom{a}{b} = y_i \; i=1,2 \ldots n. \quad (8)$$

Combining all these n observation equations into one matrix equation we get, $$\begin{pmatrix} x_1 & 1 \\ x_2 & 1 \\ \vdots & \vdots \\ x_n & 1 \end{pmatrix} \binom{a}{b} = \begin{pmatrix} y_1 \\ y_2 \\ \vdots \\ y_n \end{pmatrix} \quad (9)$$

which can be written as, $$H_s u_s = v_s \quad (10)$$

where $H_s$ is the observation matrix, $u_s$ is the parameter vector, and $V_s$ is the observation vector. The least-squares estimate for us is given by [8], $$\hat{u}_s=(H_s^T H_s)^{-1} H_s^T v_s. \quad (11)$$

This is a simple equation to solve since $H_s^T H_s$ is a 2×2 symmetric matrix which is easy to invert [9].

This method can be applied to both the start and stop coordinates. We obtain two lines with about the same slope and different y intercepts. Actually, the slopes should be exactly the same; however, errors in the estimates will lead to slightly different slopes. We can just average the two slope values to get an improved estimate.

A better way to perform this estimation problem is to model the PDF417 label by two parallel lines (i.e. having the same slope) and jointly estimating the parameters of both lines. That method is described in the next section.

1.2.2. Estimating the Start and Stop Positions Jointly

We showed in the previous section that we can estimate the parameters of the lines along the start and stop patterns separately. Here we show how to jointly estimate the parameters of the two lines simultaneously.

The lines for the start and stop patterns can be written as, $$y=ax+b_{st} \; \text{Start Line} \quad (12)$$

$$y=ax+b_{sp} \; \text{Stop Line} \quad (13)$$

where a is the slope of both lines, $b_{st}$ is the y-intercept of the start line, and $b_{sp}$ is the y-intercept of the stop line.

We use both sets of coordinates obtained from the start and stop patterns, $$\{(x_{st1}, y_{st1}), (x_{st2}, Y_{st2}), \ldots (x_{stn}, y_{stn})\} \quad (14)$$

$$\{(x_{sp1}, y_{sp1}), (X_{sp2}, Y_{sp2}), \ldots (x_{spn}, y_{spn})\} \quad (15)$$

to jointly estimate all three parameters: $(a, b_{st}, b_{sp})$. the i-th start line observation equation can be written as, $$(x_{sti} \; 1 \; 0)\begin{pmatrix} a \\ b_{st} \\ b_{sp} \end{pmatrix} = y_{sti} \quad (16)$$

and the i-th stop line observation equation can be written as, $$(x_{spi} \quad 0 \quad 1) \begin{pmatrix} a \\ b_{st} \\ b_{sp} \end{pmatrix} = y_{spi}. \tag{17}$$

Combining n of these two observation equations gives the following matrix equation, $$\begin{pmatrix} x_{st1} & 1 & 0 \\ x_{sp1} & 0 & 1 \\ x_{st2} & 1 & 0 \\ x_{sp2} & 0 & 1 \\ \vdots & \vdots & \vdots \\ x_{stn} & 1 & 0 \\ x_{spn} & 0 & 1 \end{pmatrix} \begin{pmatrix} a \\ b_{st} \\ b_{sp} \end{pmatrix} = \begin{pmatrix} y_{st1} \\ y_{sp1} \\ y_{st2} \\ y_{sp2} \\ \vdots \\ y_{stn} \\ y_{spn} \end{pmatrix} \tag{18}$$

which can be written as, $$H_j u_j = v_j \tag{19}$$

where $H_j$ is the observation matrix, $u_j$ is the parameter vector, and $v_j$ is the observation vector. The least-squares estimate for $u_j$ is given by [8], $$\hat{u}_j = (H_j^T H_j)^{-1} H_j^T v_j. \tag{20}$$

Solving this equation requires inverting $H_j^T H_j$ which is a 3×3 symmetric matrix. There are numerous methods of efficiently solving such a 3×3 linear system [9]. This is a little more difficult than the separate estimation problem, however, the errors in the joint estimates are significantly smaller than those for the separate estimate, even once you average them. Thus the extra computation is worth the additional complexity. One may often require much fewer start and stop coordinates to obtain good slope and y-intercept estimates.

FIG. 15 shows the PDF417 label, the detected start and stop coordinates and the two parallel lines that have been fitted to those coordinates.

1.3 Placement of Raster Pattern

Once we have the equations along the start and stop patterns it is straightforward to determine the placement of the raster pattern needed for rotation. We assume in this section that the magnitude of the slope is less that one and so we are using Equation 3. If that is not the case then we just exchange the roles of x and y. Given that we have solved for the parameter of Equation 13 as described above the raster pattern must be rotated by an angle $$\theta = \arctan(a) \tag{21}$$

where a is the slope of the lines.

To obtain the x and y offsets we start with the line parallel to the start and stop lines and midway between them which is given by, $$y = ax + \frac{b_1 + b_2}{2}. \tag{22}$$

The center of the label is on that line. To get a rough idea where on that line (since we only need a rough idea) we let, $$x_o = \frac{\max_i x_i + \min_i x_i}{2} \tag{23}$$

where $x_i$ varies over all the start and stop x coordinates. Then given the approximate x-offset we use Equation 22 to get the y-offset, $$y_o = ax_o + \frac{b_1 + b_2}{2}. \tag{24}$$

The raster pattern is to be centered on $(x_o, y_o)$ and rotated by an angle $\theta$.

1.4 Conclusions

With the use of the open-loop observers for the x and y electromechanical systems and the PDF417 position estimator we can determine the rotation angle and the vertical and horizontal offsets of a PDF417 label anywhere in the scanner field-of-view. With this approach the standard omnidirectional 1D pattern can be used simultaneously to search for the PDF417 label while in parallel attempting to decode 1D bar codes. So the system can read either 1D or a PDF417 bar codes omnidirectionally.

The invention further allows provision of a more flexible scheme in selecting an appropriate security level for a symbol and providing an adjustable security level, in particular allowing partial decoding of a symbol. In particular the invention provides a method of encoding information in which information is converted into data codewords, the data codewords are divided into sections and a security level is selected for each section. Accordingly a symbol can be sub-divided into sections each having a different security level.

Encoding Process

For purposes of explanation, global security level (GSL) refers to the security level of the entire symbol, while sectional security level (SSL) refers to the security level of each section of the symbol. GSL and the number of corresponding global error correction codewords, GEC, conform to the following relationship; $GEC=(2^{GSL+1}-2)$. Two row indicator codewords account for the need to subtract 2 in the equation.

Before the actual decoding process takes place, a suitable value M is selected for the desired security level. There are two ways of selecting M. In one embodiment consistent with the present invention, the value M for each security level remains constant and is preferably hard-coded in encoder 220. The selection of an appropriate value for M depends on several variables including GSL and SSL according to the following relationship:

$$M = 2^{GSL-SSL}$$

The following table provides some examples of the above equation.

| GSL | SSL | N |
| --- | --- | --- |
| 6 | 5 | 2 |
| 7 | 5 | 4 |
| 8 | 5 | 8 |

To protect each section against excessive damage that renders that section unreadable, the number of sectional error codewords, SEC, should be at least ten percent of the number of sectional data codewords, SDC, for the corresponding section. For explanatory purposes, the desired minimum sectional security level, MinSSL, will be initialized to 5. For example when MinSSL=5, there are 62 sectional error correction codewords. That provides sufficient security for each section without greatly increasing the computational complexity. Because, SSL≧MinSSL, in our example, SSL≧5.

Assuming that a PDF 417 symbol contains a number of data codewords, C, the values of MinSSL and SSL satisfy the following:

$$(2^{MinSSL+1} - 2) \leq (2^{SSL+1} - 2) < \frac{GEC}{M}$$

Alternatively, the desired value of M can be provided interactively by a user through an input terminal. In addition to selecting the desired value of M, the user can also choose the size of each section, so each section can have a different size. The selection information received by the input terminal is transmitted to an encoder, which will then encode the selection information in a row identifier or a size codeword. Although this scheme can be applied for all security levels, it is most highly recommended to high security levels (6 through 8). At high security levels, error correction is very time consuming and the scheme improves the performance significantly. On the other hand, the benefits of the scheme may be negligible at low security levels and the overhead may be too great to justify implementing such scheme.

Figure 16:
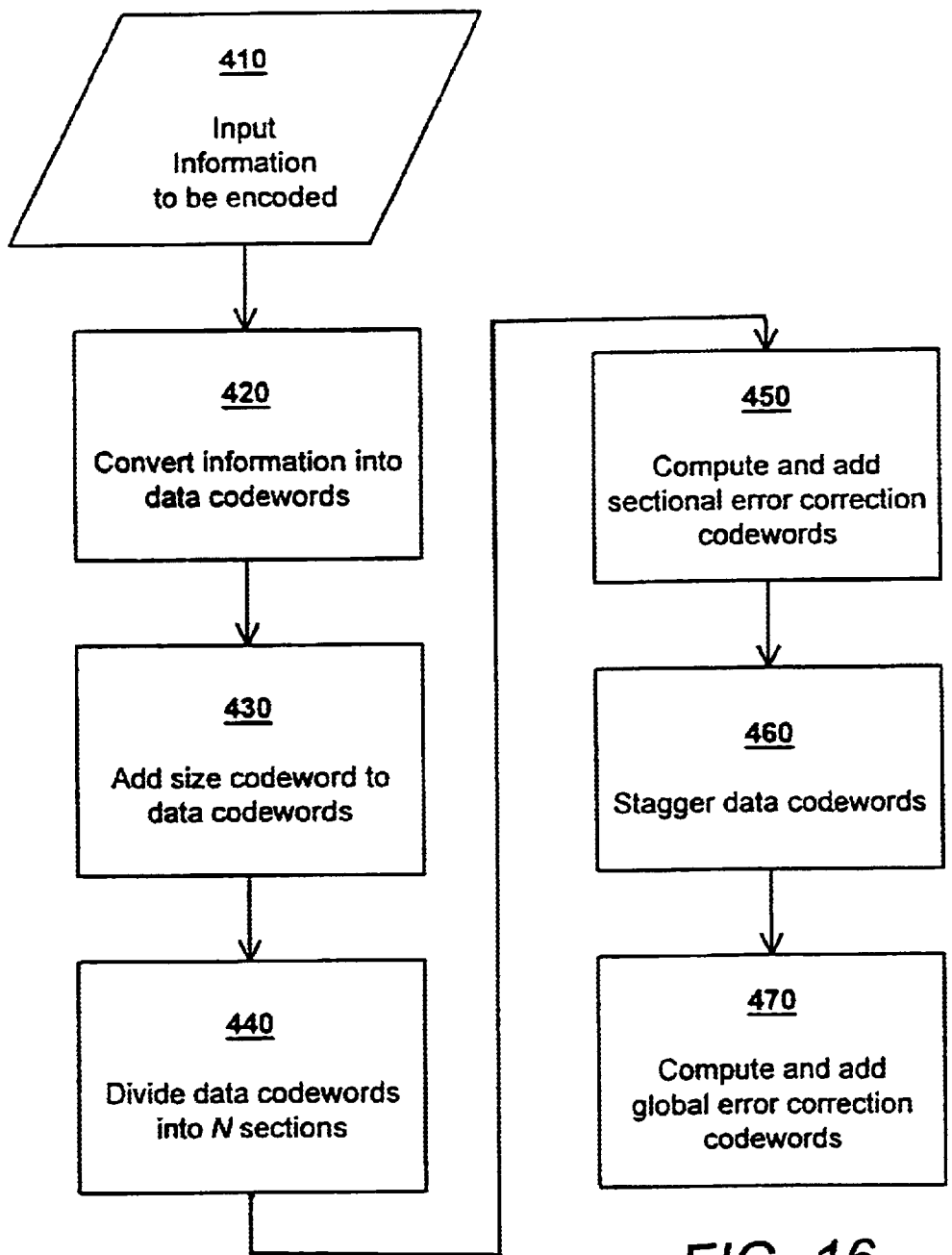
FIG. 16 is a flowchart illustrating a data encoding process.

FIG. 16 is a flowchart illustrating the encoding process. First, information to be encoded is input through the input terminal (step 410). Input terminal may receive the information through a keyboard to transport pre-stored information from other devices. It then transmits the information to the encoder, which then converts the information into data codewords (step 420).

Generally, a PDF417 symbol is encoded with error correction codewords for the entire matrix representing the symbol. The present invention provides an additional level of error correction for each of the N sections, which is further encoded at security level SSL. This additional encoding process serves two purposes. First, the additional error correction information is encoded into row identifiers and used in decoding each of the N sections. Second, these error correction codewords provide additional, optional error correction capability, making the symbol more secure.

Additionally, to protect against concentrated damage in a symbol, the codewords of the different sections are not printed in the same area but staggered, i.e., every Nth codeword of each section is printed in the same physical section. Thus, each printed section contains 1/N contribution from each of the N logical sections. Therefore, even if one entire physical section is destroyed, the damage to each of the logical sections is only 1/N. PDF417 symbology consistent with the present invention will hereinafter be referred to as "embedded PDF417."

In embedded PDF417, the encoder adds a size codeword to the existing data codewords, C, equal to the number of codewords including the size character, rendering a total of C+1 codewords (step 430). The encoder then divides the C+1 data codewords into N sections, each of size (C+1)/N (step 440). If C+1 is not an integer multiple of N, two possible alternatives exist. First, pad characters (p) can be added such that (C+1+p) is a multiple of N. Second, the Nth section can have fewer codewords, determined by C+1−((C+1)/N*(N−1)).

Thereafter, the encoder calculates sectional error correction and detection characters for each of the N sections at security level SSL. The encoder then appends the calculated sectional error correction/detection codewords to their respective data groups (step 450). At this stage, the number of data codewords is $C+1+p+2^{SSL+1}*N$. This completes the first phase of the encoding process, and each of the N sections serves as data for the next phase.

In the second phase, the encoder staggers data codewords from the first phase, i.e., every Nth codeword of each data codeword is selected for a single section (step 460). The original ordering of the codewords is as follows:

$S_{ij}$ is the jth codeword of section I,

Where $0 \leq i \leq N-1$ and $$0 \leq i \leq \frac{C+1+p}{N} + 2^{SSL+1} = j_{max}$$

The new order of the codewords after staggering is:

$$S_{00}S_{10} \ldots S_{(N-1)0}S_{01}S_{11} \ldots S_{(N-1)1} \ldots S_{0(N-1)}S_{1(N-1)} \ldots S_{jmax(N-1)}$$

Additionally the encoder adds pad characters ($p_2$) depending on the rows or columns required to allow proper matrix representation. Now the encoder calculates global error correction codewords for the entire symbol at security level SSL and appends the global error correction codewords to the data characters (step 470). The total number of codewords at this stage is $C+p+p_2+1+2^{SSL+1}*(N+1)$.

Next the encoder arranges the codewords in a matrix depending on the number of rows or columns necessary.

The encoder calculates row identifiers and adds them to the matrix as well as the Start and Stop characters. Thereafter the encoder transmits the encoded information to a printer which then prints a bar code using a standard PDF printer driver.

If it is desirable to reduce the surface area of the bar symbol being printed, however, a variation of the above scheme is available. Instead of encoding the data in the second phase at security level SSL, the data can be encoded at security level 0 with only row identifiers encoded to signify a security level SSL. This saves $2^{SSL+1}-2$ codewords. This variation, however, provides only sectional error correction but not global error correction.

Decoding Process

The low-level decoding process for the embedded PDF417 is essentially the same as one described in U.S. Pat. No. 5,243,665 incorporated herein by reference. However, instead of having one error count (the number of undecoded codewords), there are N sectional error counts in embedded PDF417.

Figure 17:
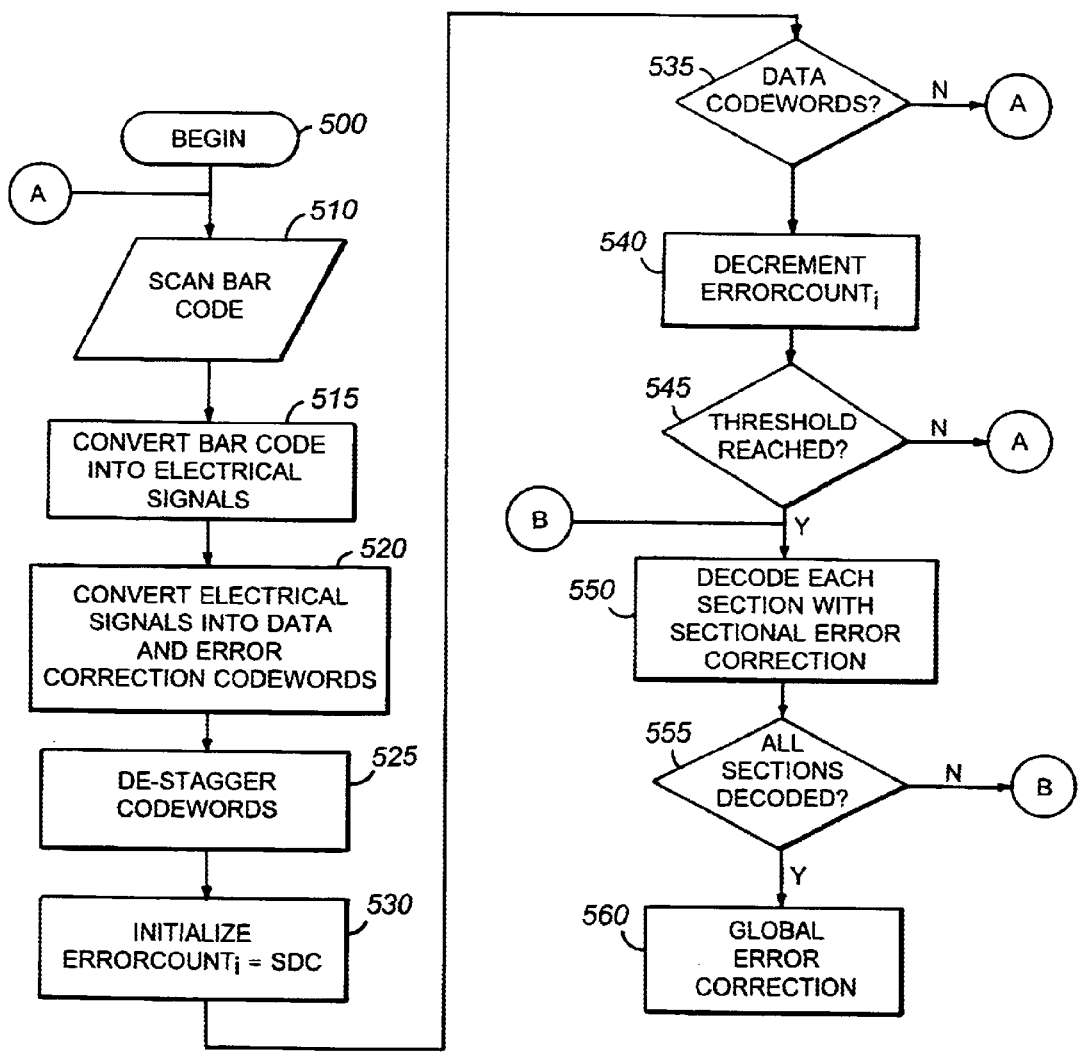
FIG. 17 is a flowchart illustrating a further data encoding process.

FIG. 17 is a flowchart illustrating the decoding process consistent with the present invention. The decoding process begins (step 500) and a converter scans the bar code (step 510) and converts the image of the bar code into electrical signals (step 515). The converter then transmits the electrical signals to the decoder which decodes the electrical signals into data and error correction codewords (step 520).

Before the decoding process begins, the decoder de-staggers the codewords (step. 525) and initializes a sectional error count, ErrorCount, to the total number of codewords in each section, SDC (step 530). The decoder then begins to decode data codewords of each section and if it finds a data codeword (step 535), it decrements a corresponding sectional error count (step 540). If not the decoder returns to step 510 to scan the bar code again. The decoder can decode each section as soon as it obtains a threshold level of data codewords, where Threshold Level=Number of error correction codewords.

Once the threshold level is reached for each section (step 545) the decoder attempts to decode that section with sectional error correction (step 550). The decoder constructs an error position polynomial for each of the N sections. At this point, each section is ready for the error correction process and sectional error correction is performed for each section at security level SSL. The decoder calculates a checksum to verify that the section has been decoded. Alternatively, the decoder can decode each section after all sections reach the threshold level.

To decode each section, the decoder preferably uses the same decoding and matrix-filling algorithm as that disclosed in U.S. Pat. No. 5,243,665, except that there are N number of error counts. If r is the row and c is the column of the decoded codeword, then the error count is updated as shown below:

$i=((TotalCol-2)*r+c-1);$ $i=i \; MOD \; N;$ $ErrorCount_i=ErrorCount_i-1;$ and $0 \leq i \leq N-1$ where $ErrorCount_i$ is the ith errorcount, and TotalCol is the number of columns in the symbol including row identifiers. According to the above equations, codewords are destaggered into their respective sections, 0 through N, using modules operation. Thus, for example, the 0th, Nth, etc., codewords belong to the 0th section, and 1st, Nth+1, 2Nth+1 etc., codewords belong to the first section, and so on.

If each section is decoded, preferably using the Reed-Solomon correction algorithm (step 555), the decoder performs global error correction for the de-staggered symbol as a whole at security level GSL (step 560). The decoder also examines the checksum to verify that the symbol has been properly corrected. As an additional test, the decoder verifies the size of each section by determining whether the value of the size (szewd) codeword, the first codeword, equals 1/N*szewd.

If the expected number of errors is very small, e.g., a two-dimensional CCD array where most of the data codewords are captured, then a slightly different approach is available using the Berle-Kamp Massey algorithm because the complexity of error correction depends on the security level rather than the number of erasures. A detailed description of the Berle-Kamp Massey algorith is provided in Richard e. Blahut, *Theory and Practice of Error Control Codes* 174–187 (1984). The Berle-Kamp Bassey algorithm differs from a traditional PDF417 high security level symbol, where even if most of the codewords have been captured, the time needed for error correction is similar to the time needed for codewords with a large number of erasures.

In the decoding process described above, error correction is first attempted in each of the N sections after all N sections have reached their threshold. To do so requires multiple error counts. Alternatively, if the number of erasures is expected to be very small, the decoder may be modified to decode the symbol using only one error count corresponding to the global error correction codewords.

Performance of Embedded PDF417

Under the traditional PDF417, if the numbers of data codewords are C and the number of error corrections codewords is GEC, the number of total codewords in the symbol is (ignoring the pads):

$Codewords = C+1+GEC+2 = C+1+2^{GSL+1}$

The number of codewords in the embedded PDF417 is:

$Codewords = C+1+2^{SSL+1} \cdot (N+1)$

As mentioned above, $N = 2^{GSL+1}/2^{SSL+1} = 2^{GSL-SSL}$
In the above example, SSL=5 and therefore $N=2^{GSL-5}$. Therefore, $Codewords = C+1+2^{SSL+1} \cdot (2^{GSL-5}+1) = C+1+2^{GSL+1}+2^{SSL+1}$ If an outer security level of SSL is used, the overhead in the new scheme is $2^{SSL+1}$. Thus, the overhead is $2^{SSL+1}=2^{5+1}=64$ If a global security level of 0 is used, however, the overhead is 2 codewords ($2^{0+1}=2$ codewords) Therefore, embedded PDF 417 significantly reduces the overhead by decreasing the number of necessary codewords.

At the same time, embedded PDF417 maintains nearly equivalent level of error correction capability. The error correction capability of a traditional PDF417 is $2^{GSL+1}-2$. In the embedded PDF417, the error correction capability is $(2^{SSL+1}-2) *N=62*2^{GSL-1}$. The following table compares the error correction capabilities of PDF 417 and embedded PDF417:

| Scheme/Security Level | SL6 | SL7 | SL8 |
|---|---|---|---|
| Traditional PDF | 126 | 254 | 510 |
| Embedded PDF | 124 | 248 | 496 |

As the table illustrates, the level of security provided consistent with the present invention is almost as high as one provided by the traditional PDF417.

One of the greatest advantage of embedded PDF417 is reduction of operational complexity. As mentioned above, the complexity of the embedded PDF417 error correction algorithm at a higher security levels is $C(GEC) \propto GEC^2$ where C(GEC) is the complexity, and
GEC is the number of error correction codewords corresponding to security level, GSL
On the other hand, the error correction complexity of the embedded PDF417 is given by:

$$C(N, GEC) \propto \frac{GEC^2}{N}$$

where N is the number of sections, and
C(N,GEC) is the error correction complexity of N sections.

Symbols and methods associated with the present invention then reduce the error correction complexity by a factor of N. The higher the N, the larger the reduction. N should not become too high, however, because a high N provides a decreased security level for each section.

The following table shows the estimated improvement in the decoding speed of the present invention compared to the traditional PDF417, based on both theoretical computation and actual testing. For example, if SSL=5 and GSL=6, then $N=2^{GSL-SSL}=2^{6-5}=2$. Therefore, the time taken for error correction is halved, i.e., $1/N=\frac{1}{2}$.

| Security Level GSL | Time for Traditional PDF t (GSL) | Time for Embedded PDF t (GSL)/N | Improvement In Speed Of Embedded PDF |
|---|---|---|---|
| 6 | t (6) | t (6)/2 | 200% |
| 7 | t (7) | t (7)/4 | 400% |
| 8 | t (8) | t (8)/8 | 800% |

Moreover, systems and methods associated with the present invention facilitate multiple security levels inside a symbol. During the input process, a user may select the desired security level for each of the N sections, or hard-code it into the decoding software. Therefore, instead of all sections having the same security level, each section may have a different security level. Multiple security level enables one to prioritise highly critical data with a symbol.

Alternatively, a user can designate a high security section to store critical data. A user can also define each section to be of varying sizes. Additionally, a user may opt to encode a particular section at a higher security level. These are just some examples of how the embedded PDF417 allows a level of flexibility in error correction that was not available in the traditional PDF417 symbology.

As previously mentioned, traditional PDF417 symbology decodes a symbol as a whole. Once the number of unknown codewords reaches the threshold level, error correction is performed. If the number of errors and erasures exceed the number of errors tolerable for the corresponding security level, the symbol cannot be decoded. In such cases, additional codewords are acquired and error correction is repeatedly attempted until the symbol is decoded. In some cases, however, the symbol may be so damaged that even repeated attempts cannot correct errors. Traditional PDF417 does not provide a way of decoding such symbol.

Even if the entire symbol cannot be decoded, however, it may be desirable to retrieve at least some data from the non-damaged sections of the symbol. Embedded PDF417 facilitates this because each section is decoded separately. It may be possible to decode only certain sections and retrieve partial data from the symbol, even though the entire symbol may not be decodable.

Moreover, the traditional PDF417 provides nine security levels, level 0 through level 8, which allow only a fixed number of choices for error correction capabilities. For example, if error correction capability of 186 codewords is not available, the next level of 254 codewords (level 7) must be selected. Although GF(929) theoretically facilitates any security level with the number of error correction codewords ranging from 0 to 928, PDF417 implements only a discrete number of security levels due to the inability of encoding the information into row indicators. However, because embedded PDF 417 enables a user to select different error correction capability for each section, it facilitates a variety of error correction capabilities. Additionally, selecting different combinations of N and m can achieve error correction capability greater than 510.

Embedded PDF417, a new version of the PDF417 symbology, implements a "divide-and-rule" system that greatly reduces the computational complexity in decoding a high security level symbol. The overhead involved under embedded PDF417 is negligible and requires only slight modifications to the current printing and the decoding processes. This scheme also provides certain additional features such as multiple security levels, partial decode, and adjustable security levels.

It will be apparent to those skilled in the art that various modifications and variations can be made in the decoding method and apparatus without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of encoding a set of data into a plurality of discrete multi-dimensional code symbols, the method comprising encoding a plurality of data symbols comprising subsets of the set of data, each data symbol being a discrete multi-dimensional code symbol, each of which comprises a multi-dimensional array of graphic elements bounded by boundary elements;

encoding one or more error correction symbols comprising error correction information for reconstructing data symbols, each error correction symbol being a discrete multi-dimensional code symbol, each of which comprises a multi-dimensional array of graphic elements bounded by boundary elements.

2. The method of claim 1 wherein there are a plurality of error correction symbols.

3. The method of claim 1 wherein one or more of the data symbols further comprise error correction information for reconstructing data contained in the data symbol.

4. The method of claim 1 wherein the code symbols comprise bar code symbols.

5. The method of claim 1 further comprising decoding data from the plurality of discrete multi-dimensional code symbols, the decoding comprising decoding the data symbols, decoding the error correction symbols, using the error correction information from the error correction symbols to reconstruct data symbols.

6. The method of claim 1 wherein the data symbols and error correction symbols each contain information allowing the location of the symbol within the plurality of symbols to be ascertained.

7. The method of claim 1 wherein a variable amount of data are contained in each data symbol.

8. The method of claim 1 wherein the data may be represented as information codewords in a matrix of two or more dimensions, and wherein the method further comprises deriving respective error correction codewords for information codewords extending in two dimensions, forming the data symbols from information codewords extending in one of the two dimensions and from error correction codewords derived from the information codewords extending in the one dimension; and forming the error correction symbols from error correction codewords derived from information codewords extending in the other of the two dimensions.

9. The method of claim 8 further comprising decoding, which comprises processing data symbols to reconstruct information codewords extending in one of the two dimensions using both information codewords and error correction codewords derived from the information codewords extending in the one dimension; and processing error correction symbols to reconstruct data symbols using error correction codewords derived from the information codewords extending in the second dimension.

10. A method of encoding a set of data into a plurality of discrete multi-dimensional code symbols, in which the data may be represented as information codewords in a matrix of two or more dimensions, the method comprising deriving respective error correction codewords for information codewords extending in two dimensions, forming data symbols from information codewords extending in one of the two dimensions and from error correction codewords derived from the information codewords extending in the one dimension, each data symbol comprising a multi-dimensional array of graphic elements bounded by boundary elements; and forming error correction symbols from error correction codewords derived from information codewords extending in the other of the two dimensions, each error correction symbol comprising a multi-dimensional array of graphic elements bounded by boundary elements.

11. A method of decoding a set of data from a plurality of discrete multi-dimensional code symbols, in which the data may be represented as information codewords in a matrix of two or more dimensions, and in which there are both data and error correction symbols, the method comprising processing data symbols to reconstruct information codewords extending in one of the two dimensions using both information codewords and error correction codewords derived from the information codewords extending in the one dimension, each data symbol comprising a multi-dimensional array of graphic elements bounded by boundary elements;

processing error correction symbols to reconstruct data symbols using error correction codewords derived from the information codewords extending in the second dimension, each error correction symbol comprising a multi-dimensional array of graphic elements bounded by boundary elements.

12. The method of claim 8, 9, 10, or 11, wherein the two dimensions correspond to rows and columns of a two dimensional matrix, and the discrete multi-dimensional code symbols correspond to rows or to columns.

* * * * *

UNITED STATES PATENT AND TRADEMARK OFFICE
CERTIFICATE OF CORRECTION

PATENT NO. : 6,651,893 B2
DATED : November 25, 2003
INVENTOR(S) : Duanfeng He et al.

It is certified that error appears in the above-identified patent and that said Letters Patent is hereby corrected as shown below:

Column 9,
Line 49, after "(8192)", insert -- . --.

Column 12,
Line 60, "008" should be -- 009 --.

Column 14,
Line 8, "$(x-3_k)$" should be -- $(x-3^k)$ --.

Column 17,
Line 1, before "laser", insert -- the --.
Line 59, "sample" should be -- samples --.
Line 61, before "gives", insert -- it --.
Line 62, before "beam", delete "is".

Column 18,
Line 23, "$H_{tbe}(Z)$" should be -- $H_{tbe(Z)}$ --.
Line 42, "be" should be -- by --.

Column 21,
Line 49, "that" should be -- than --.

Column 22,
Line 2, "minx" should be -- min $x_i$ --.
Line 24, "codes" should be -- code --.

Column 25,
Line 53, "algorith" should be -- algorithm --.
Line 55, "Bassey" should be -- Massey --.

Column 26,
Line 19, after "64", insert -- . --.
Line 21, after "codewords)", insert -- . --.
Line 28, "$*N=62*2^{GSL-1}$" should be -- $*N-62*2^{GSL-5}$ --.

UNITED STATES PATENT AND TRADEMARK OFFICE
CERTIFICATE OF CORRECTION

PATENT NO. : 6,651,893 B2
DATED : November 25, 2003
INVENTOR(S) : Duanfeng He et al.

It is certified that error appears in the above-identified patent and that said Letters Patent is hereby corrected as shown below:

<u>Column 27,</u>
Line 21, second occurrence of "level" should be -- levels --.

Signed and Sealed this

Eleventh Day of May, 2004

JON W. DUDAS
*Acting Director of the United States Patent and Trademark Office*